United States Patent
Proctor, Jr. et al.

(10) Patent No.: US 8,059,727 B2
(45) Date of Patent: Nov. 15, 2011

(54) PHYSICAL LAYER REPEATER CONFIGURATION FOR INCREASING MIMO PERFORMANCE

(75) Inventors: James A. Proctor, Jr., Melbourne Beach, FL (US); Kenneth M. Gainey, Satellite Beach, FL (US); James C. Otto, West Melbourne, FL (US)

(73) Assignee: QUALCOMM Incorporated, San Diego, CA (US)

( * ) Notice: Subject to any disclaimer, the term of this patent is extended or adjusted under 35 U.S.C. 154(b) by 767 days.

(21) Appl. No.: 11/340,838

(22) Filed: Jan. 27, 2006

(65) Prior Publication Data

US 2006/0193271 A1    Aug. 31, 2006

Related U.S. Application Data

(60) Provisional application No. 60/647,386, filed on Jan. 28, 2005.

(51) Int. Cl.
 *H04L 27/28* (2006.01)
(52) U.S. Cl. ...................................................... 375/260
(58) Field of Classification Search .................. 375/211, 375/212, 213, 214, 215, 260, 267, 294, 315, 375/295, 347, 349; 700/53; 455/7, 11.1, 455/101, 132–141
See application file for complete search history.

(56) References Cited

U.S. PATENT DOCUMENTS

| | | | |
|---|---|---|---|
| 3,363,250 A | 1/1968 | Jacobson | |
| 4,000,467 A | 12/1976 | Lentz et al. | |
| 4,001,691 A | 1/1977 | Gruenberg et al. | |
| 4,061,970 A | 12/1977 | Magneron et al. | |
| 4,081,752 A | 3/1978 | Sumi et al. | |
| 4,124,825 A | 11/1978 | Webb et al. | |
| 4,204,016 A | 5/1980 | Chavannes et al. | |
| 4,334,323 A | 6/1982 | Moore et al. | |
| 4,368,541 A | 1/1983 | Evans et al. | |
| 4,509,206 A | 4/1985 | Carpe et al. | |
| 4,701,935 A | 10/1987 | Namiki et al. | |
| 4,723,302 A | 2/1988 | Fulmer et al. | |
| 4,777,653 A | 10/1988 | Bonnerot et al. | |
| 4,783,843 A | 11/1988 | Leff et al. | |
| 4,820,568 A | 4/1989 | Harpell et al. | |
| 4,922,259 A | 5/1990 | Hall et al. | |
| 5,023,930 A | 6/1991 | Leslie et al. | |
| 5,095,528 A | 3/1992 | Leslie et al. | |
| 5,214,788 A | 5/1993 | Delaperriere et al. | |
| 5,220,562 A | 6/1993 | Takada et al. | |

(Continued)

FOREIGN PATENT DOCUMENTS

CN    1186401 A    7/1998

(Continued)

OTHER PUBLICATIONS

International Search Report, PCT/US06/02900, International Search Authority, European Patent Office, May 13, 2008.

(Continued)

*Primary Examiner* — Sam K Ahn
(74) *Attorney, Agent, or Firm* — Linda G. Gunderson

(57) ABSTRACT

A wireless network includes at least one Multiple Input Multiple Output (MIMO) wireless network station and two or more physical layer repeaters. Each of the physical layer repeaters is for receiving a wireless signal to or from the at least one MIMO wireless network station and re-transmitting the wireless signal while continuing to receive the wireless signal. The repeaters may be either frequency translating repeaters or non-frequency translating repeaters.

106 Claims, 7 Drawing Sheets

U.S. PATENT DOCUMENTS

| | | |
|---|---|---|
| 5,280,480 A | 1/1994 | Pitt et al. |
| 5,333,175 A | 7/1994 | Ariyavisitakul et al. |
| 5,341,364 A | 8/1994 | Marra et al. |
| 5,349,463 A | 9/1994 | Hirohashi et al. |
| 5,368,897 A | 11/1994 | Kurihara et al. |
| 5,371,734 A | 12/1994 | Fischer et al. |
| 5,373,503 A | 12/1994 | Chen et al. |
| 5,383,144 A | 1/1995 | Kato |
| 5,408,197 A | 4/1995 | Miyake et al. |
| 5,408,618 A | 4/1995 | Aho et al. |
| 5,430,726 A | 7/1995 | Moorwood et al. |
| 5,446,770 A | 8/1995 | Urabe et al. |
| 5,465,251 A | 11/1995 | Judd et al. |
| 5,471,642 A | 11/1995 | Palmer et al. |
| 5,485,486 A | 1/1996 | Gilhousen et al. |
| 5,509,028 A | 4/1996 | Marque-Pucheu et al. |
| 5,515,376 A | 5/1996 | Murthy et al. |
| 5,519,619 A | 5/1996 | Seda et al. |
| 5,608,755 A | 3/1997 | Rakib et al. |
| 5,610,916 A | 3/1997 | Kostreski et al. |
| 5,648,984 A | 7/1997 | Kroninger et al. |
| 5,654,979 A | 8/1997 | Levin et al. |
| 5,659,879 A | 8/1997 | Dupuy et al. |
| 5,678,177 A | 10/1997 | Beasley et al. |
| 5,678,198 A | 10/1997 | Lemson et al. |
| 5,684,801 A | 11/1997 | Amitay et al. |
| 5,697,052 A | 12/1997 | Treatch et al. |
| 5,726,980 A | 3/1998 | Rickard et al. |
| 5,732,334 A | 3/1998 | Miyake et al. |
| 5,745,846 A | 4/1998 | Myer et al. |
| 5,754,540 A | 5/1998 | Liu et al. |
| 5,764,636 A | 6/1998 | Edsall et al. |
| 5,767,788 A | 6/1998 | Ness |
| 5,771,174 A | 6/1998 | Spinner et al. |
| 5,784,683 A | 7/1998 | Sistanizadeh et al. |
| 5,794,145 A | 8/1998 | Milam et al. |
| 5,812,933 A | 9/1998 | Niki et al. |
| 5,815,795 A | 9/1998 | Iwai et al. |
| 5,825,809 A | 10/1998 | Sim |
| 5,852,629 A * | 12/1998 | Iwamatsu .................. 375/211 |
| 5,857,144 A | 1/1999 | Mangum et al. |
| 5,862,207 A | 1/1999 | Aoshima et al. |
| 5,875,179 A | 2/1999 | Tikalsky et al. |
| 5,883,884 A | 3/1999 | Atkinson et al. |
| 5,884,181 A | 3/1999 | Arnold et al. |
| 5,890,055 A | 3/1999 | Chu et al. |
| 5,903,553 A | 5/1999 | Sakamoto et al. |
| 5,907,794 A | 5/1999 | Lehmusto et al. |
| 5,963,846 A | 10/1999 | Kurby et al. |
| 5,963,847 A | 10/1999 | Ito et al. |
| 5,987,304 A | 11/1999 | Latt et al. |
| 6,005,855 A | 12/1999 | Zehavi et al. |
| 6,005,884 A | 12/1999 | Cook et al. |
| 6,014,380 A | 1/2000 | Hendel et al. |
| 6,032,194 A | 2/2000 | Gai et al. |
| 6,061,548 A | 5/2000 | Reudink |
| 6,088,570 A | 7/2000 | Komara et al. |
| 6,101,400 A | 8/2000 | Ogaz et al. |
| 6,108,364 A | 8/2000 | Weaver, Jr. et al. |
| 6,128,512 A | 10/2000 | Trompower et al. |
| 6,128,729 A | 10/2000 | Kimball et al. |
| 6,163,276 A | 12/2000 | Irving et al. |
| 6,188,694 B1 | 2/2001 | Fine et al. |
| 6,188,719 B1 | 2/2001 | Collomby et al. |
| 6,195,051 B1 | 2/2001 | McCoy et al. |
| 6,202,114 B1 | 3/2001 | Dutt et al. |
| 6,215,982 B1 | 4/2001 | Trompower et al. |
| 6,219,739 B1 | 4/2001 | Dutt et al. |
| 6,222,503 B1 | 4/2001 | Gietema et al. |
| 6,272,351 B1 | 8/2001 | Langston et al. |
| 6,285,863 B1 | 9/2001 | Zhang et al. |
| 6,298,061 B1 | 10/2001 | Chin et al. |
| 6,304,563 B1 | 10/2001 | Blessent et al. |
| 6,304,575 B1 | 10/2001 | Carroll et al. |
| 6,331,792 B1 | 12/2001 | Tonietto et al. |
| 6,339,694 B1 | 1/2002 | Komara et al. |
| 6,342,777 B1 | 1/2002 | Takahashi et al. |
| 6,363,068 B1 | 3/2002 | Kinoshita et al. |
| 6,370,185 B1 | 4/2002 | Schmutz et al. |
| 6,370,369 B1 | 4/2002 | Kraiem et al. |
| 6,377,612 B1 | 4/2002 | Baker et al. |
| 6,377,640 B2 | 4/2002 | Trans et al. |
| 6,384,765 B1 | 5/2002 | Sjostrand et al. |
| 6,385,181 B1 | 5/2002 | Tsutsui et al. |
| 6,388,995 B1 | 5/2002 | Gai et al. |
| 6,393,299 B1 | 5/2002 | Mizumoto et al. |
| 6,404,775 B1 | 6/2002 | Leslie et al. |
| 6,441,781 B1 | 8/2002 | Rog et al. |
| 6,473,131 B1 | 10/2002 | Neugebauer et al. |
| 6,480,481 B1 | 11/2002 | Park et al. |
| 6,501,955 B1 | 12/2002 | Durrant et al. |
| 6,535,732 B1 | 3/2003 | McIntosh et al. |
| 6,539,028 B1 | 3/2003 | Soh et al. |
| 6,539,204 B1 | 3/2003 | Marsh et al. |
| 6,549,542 B1 | 4/2003 | Dong et al. |
| 6,549,567 B1 | 4/2003 | Fullerton et al. |
| 6,563,468 B2 | 5/2003 | Hill et al. |
| 6,574,198 B1 | 6/2003 | Petersson et al. |
| 6,628,624 B1 | 9/2003 | Mahajan et al. |
| 6,664,932 B2 | 12/2003 | Sabet et al. |
| 6,671,502 B1 | 12/2003 | Ogawa et al. |
| 6,684,058 B1 | 1/2004 | Karacaoglu et al. |
| 6,690,657 B1 * | 2/2004 | Lau et al. .................. 370/315 |
| 6,694,125 B2 | 2/2004 | White et al. |
| 6,718,160 B2 | 4/2004 | Schmutz et al. |
| 6,728,541 B2 | 4/2004 | Ohkura et al. |
| 6,766,113 B1 | 7/2004 | Al-Salameh et al. |
| 6,781,544 B2 | 8/2004 | Saliga et al. |
| 6,788,256 B2 | 9/2004 | Hollister |
| 6,880,103 B2 | 4/2005 | Kim et al. |
| 6,888,881 B1 | 5/2005 | Nagano |
| 6,904,266 B1 | 6/2005 | Jin et al. |
| 6,906,669 B2 | 6/2005 | Sabet et al. |
| 6,934,511 B1 | 8/2005 | Lovinggood et al. |
| 6,934,555 B2 | 8/2005 | Silva et al. |
| 6,944,139 B1 | 9/2005 | Campanella et al. |
| 6,957,042 B2 | 10/2005 | Williams et al. |
| 6,983,162 B2 * | 1/2006 | Garani et al. .................. 455/518 |
| 6,985,516 B1 | 1/2006 | Easton et al. |
| 6,990,313 B1 | 1/2006 | Yarkosky et al. |
| 7,027,418 B2 | 4/2006 | Gan et al. |
| 7,027,770 B2 | 4/2006 | Judd et al. |
| 7,043,203 B2 | 5/2006 | Miquel et al. |
| 7,050,442 B1 | 5/2006 | Proctor et al. |
| 7,050,452 B2 | 5/2006 | Sugar et al. |
| 7,058,071 B1 | 6/2006 | Myles et al. |
| 7,058,368 B2 | 6/2006 | Nicholls et al. |
| 7,088,734 B2 | 8/2006 | Newberg et al. |
| 7,103,344 B2 | 9/2006 | Menard et al. |
| 7,120,930 B2 | 10/2006 | Maufer et al. |
| 7,123,670 B2 | 10/2006 | Gilbert et al. |
| 7,123,676 B2 | 10/2006 | Gebara et al. |
| 7,132,988 B2 | 11/2006 | Yegin et al. |
| 7,133,391 B2 | 11/2006 | Belcea et al. |
| 7,133,460 B2 | 11/2006 | Bae et al. |
| 7,139,527 B2 * | 11/2006 | Tamaki et al. .................. 455/16 |
| 7,167,526 B2 | 1/2007 | Liang et al. |
| 7,187,904 B2 | 3/2007 | Gainey et al. |
| 7,193,975 B2 | 3/2007 | Tsutsumi et al. |
| 7,194,275 B2 | 3/2007 | Bolin et al. |
| 7,200,134 B2 | 4/2007 | Proctor, Jr. et al. |
| 7,215,964 B2 | 5/2007 | Miyake et al. |
| 7,230,935 B2 | 6/2007 | Proctor, Jr. et al. |
| 7,233,771 B2 | 6/2007 | Proctor, Jr. et al. |
| 7,248,645 B2 | 7/2007 | Vialle et al. |
| 7,254,132 B2 | 8/2007 | Takao et al. |
| 7,299,005 B1 | 11/2007 | Yarkosky et al. |
| 7,315,573 B2 | 1/2008 | Lusky et al. |
| 7,319,714 B2 | 1/2008 | Sakata et al. |
| 7,321,787 B2 | 1/2008 | Kim et al. |
| 7,339,926 B2 | 3/2008 | Stanwood et al. |
| 7,352,696 B2 | 4/2008 | Stephens et al. |
| 7,406,060 B2 | 7/2008 | Periyalwar et al. |
| 7,409,186 B2 | 8/2008 | Van Buren et al. |
| 7,430,397 B2 | 9/2008 | Suda et al. |
| 7,450,936 B2 | 11/2008 | Kim et al. |
| 7,457,587 B2 | 11/2008 | Chung |

| | | |
|---|---|---|
| 7,486,929 B2 | 2/2009 | Van Buren et al. |
| 7,577,398 B2 | 8/2009 | Judd et al. |
| 7,590,145 B2 | 9/2009 | Futch et al. |
| 7,623,826 B2 | 11/2009 | Pergal et al. |
| 7,676,194 B2 | 3/2010 | Rappaport et al. |
| 7,729,669 B2 | 6/2010 | Van Buren et al. |
| 2001/0031646 A1 | 10/2001 | Williams et al. |
| 2001/0040699 A1 | 11/2001 | Osawa et al. |
| 2001/0050580 A1 | 12/2001 | O'toole et al. |
| 2001/0050906 A1 | 12/2001 | Odenwalder et al. |
| 2001/0054060 A1 | 12/2001 | Fillebrown et al. |
| 2002/0004924 A1 | 1/2002 | Kim et al. |
| 2002/0018487 A1 | 2/2002 | Chen et al. |
| 2002/0034958 A1 | 3/2002 | Oberschmidt et al. |
| 2002/0045461 A1 | 4/2002 | Bongfeldt et al. |
| 2002/0061031 A1 | 5/2002 | Sugar et al. |
| 2002/0089945 A1 | 7/2002 | Belcea et al. |
| 2002/0101843 A1 | 8/2002 | Sheng et al. |
| 2002/0102948 A1 | 8/2002 | Stanwood et al. |
| 2002/0109585 A1 | 8/2002 | Sanderson et al. |
| 2002/0115409 A1* | 8/2002 | Khayrallah ............... 455/41 |
| 2002/0119783 A1 | 8/2002 | Bourlas et al. |
| 2002/0136268 A1 | 9/2002 | Gan et al. |
| 2002/0141435 A1 | 10/2002 | Newberg et al. |
| 2002/0159506 A1 | 10/2002 | Alamouti et al. |
| 2002/0163902 A1 | 11/2002 | Takao et al. |
| 2002/0177401 A1 | 11/2002 | Judd et al. |
| 2003/0026363 A1 | 2/2003 | Stoter et al. |
| 2003/0063583 A1 | 4/2003 | Padovani et al. |
| 2003/0124976 A1 | 7/2003 | Tamaki et al. |
| 2003/0139175 A1 | 7/2003 | Kim et al. |
| 2003/0179734 A1 | 9/2003 | Tsutsumi et al. |
| 2003/0185163 A1 | 10/2003 | Bertonis et al. |
| 2003/0211828 A1 | 11/2003 | Dalgleish et al. |
| 2003/0235170 A1 | 12/2003 | Trainin et al. |
| 2003/0236069 A1 | 12/2003 | Sakata et al. |
| 2004/0029537 A1 | 2/2004 | Pugel et al. |
| 2004/0038707 A1 | 2/2004 | Kim et al. |
| 2004/0047333 A1 | 3/2004 | Han et al. |
| 2004/0047335 A1 | 3/2004 | Proctor, Jr. et al. |
| 2004/0110469 A1 | 6/2004 | Judd et al. |
| 2004/0131025 A1* | 7/2004 | Dohler et al. ............. 370/328 |
| 2004/0146013 A1 | 7/2004 | Song et al. |
| 2004/0157551 A1 | 8/2004 | Gainey et al. |
| 2004/0166802 A1 | 8/2004 | McKay, Sr. et al. |
| 2004/0176050 A1 | 9/2004 | Steer et al. |
| 2004/0198295 A1 | 10/2004 | Nicholls et al. |
| 2004/0208258 A1 | 10/2004 | Lozano et al. |
| 2004/0218683 A1* | 11/2004 | Batra et al. .............. 375/261 |
| 2004/0229563 A1* | 11/2004 | Fitton et al. ............... 455/7 |
| 2004/0235417 A1 | 11/2004 | Dean |
| 2004/0248581 A1 | 12/2004 | Seki et al. |
| 2004/0264511 A1 | 12/2004 | Futch et al. |
| 2005/0014464 A1* | 1/2005 | Larsson .................. 455/11.1 |
| 2005/0030891 A1 | 2/2005 | Stephens et al. |
| 2005/0042999 A1* | 2/2005 | Rappaport ................ 455/307 |
| 2005/0130587 A1* | 6/2005 | Suda et al. ................. 455/9 |
| 2005/0190822 A1 | 9/2005 | Fujii et al. |
| 2005/0201315 A1 | 9/2005 | Lakkis et al. |
| 2005/0254442 A1 | 11/2005 | Proctor, Jr. et al. |
| 2005/0256963 A1 | 11/2005 | Proctor Jr. et al. |
| 2005/0286448 A1 | 12/2005 | Proctor et al. |
| 2006/0019603 A1 | 1/2006 | Pergal |
| 2006/0028388 A1 | 2/2006 | Schantz |
| 2006/0035643 A1 | 2/2006 | Vook et al. |
| 2006/0041680 A1 | 2/2006 | Proctor, Jr. et al. |
| 2006/0052066 A1 | 3/2006 | Cleveland et al. |
| 2006/0052099 A1 | 3/2006 | Parker et al. |
| 2006/0056352 A1 | 3/2006 | Proctor et al. |
| 2006/0063484 A1 | 3/2006 | Proctor et al. |
| 2006/0063485 A1 | 3/2006 | Gainey et al. |
| 2006/0098592 A1 | 5/2006 | Proctor, Jr. et al. |
| 2006/0183421 A1 | 8/2006 | Proctor et al. |
| 2006/0203757 A1 | 9/2006 | Young et al. |
| 2006/0262026 A1 | 11/2006 | Gainey et al. |
| 2007/0025349 A1 | 2/2007 | Bajic et al. |
| 2007/0025486 A1 | 2/2007 | Gainey et al. |
| 2007/0032192 A1 | 2/2007 | Gainey et al. |
| 2007/0121546 A1 | 5/2007 | Zuckerman et al. |
| 2007/0286110 A1 | 12/2007 | James, Jr. et al. |
| 2008/0057862 A1 | 3/2008 | Smith et al. |
| 2008/0233942 A9 | 9/2008 | Kim et al. |

FOREIGN PATENT DOCUMENTS

| | | |
|---|---|---|
| EP | 0523687 A2 | 1/1993 |
| EP | 0709973 A1 | 5/1996 |
| EP | 0715423 | 6/1996 |
| EP | 0847146 A2 | 6/1998 |
| EP | 0853393 A1 | 7/1998 |
| EP | 0860953 A1 | 8/1998 |
| GB | 2272599 A | 5/1994 |
| GB | 2351420 A | 12/2000 |
| JP | 62040895 | 2/1987 |
| JP | 63160442 | 7/1988 |
| JP | 64011428 | 1/1989 |
| JP | 2100358 A | 4/1990 |
| JP | 3021884 A | 1/1991 |
| JP | 05063623 | 3/1993 |
| JP | 05102907 | 4/1993 |
| JP | 6013947 A | 1/1994 |
| JP | 06334577 | 12/1994 |
| JP | 07030473 | 1/1995 |
| JP | 7079187 A | 3/1995 |
| JP | 07079205 | 3/1995 |
| JP | 07131401 | 5/1995 |
| JP | 8097762 A | 4/1996 |
| JP | 8274706 A | 10/1996 |
| JP | 09018484 A | 1/1997 |
| JP | 09130322 | 5/1997 |
| JP | 09162801 | 6/1997 |
| JP | 9162903 A | 6/1997 |
| JP | 09182155 | 7/1997 |
| JP | 09214418 | 8/1997 |
| JP | 10032557 A | 2/1998 |
| JP | 10107727 | 4/1998 |
| JP | 10135892 | 5/1998 |
| JP | 11055713 | 2/1999 |
| JP | 11127104 | 5/1999 |
| JP | 11298421 | 10/1999 |
| JP | 2000031877 | 1/2000 |
| JP | 2000502218 T | 2/2000 |
| JP | 2000082983 A | 3/2000 |
| JP | 2000236290 A | 8/2000 |
| JP | 2000269873 | 9/2000 |
| JP | 2001016152 | 1/2001 |
| JP | 2001111575 A | 4/2001 |
| JP | 2001136115 | 5/2001 |
| JP | 2001244864 A | 9/2001 |
| JP | 2002033691 | 1/2002 |
| JP | 2002111571 A | 4/2002 |
| JP | 2002271255 A | 9/2002 |
| JP | 2003174394 A | 6/2003 |
| JP | 2003198442 | 7/2003 |
| JP | 2003244050 | 8/2003 |
| JP | 2004056210 | 2/2004 |
| JP | 2004328666 | 11/2004 |
| JP | 2005072646 | 3/2005 |
| JP | 2005110150 | 4/2005 |
| JP | 2005236626 | 9/2005 |
| JP | 2005531202 | 10/2005 |
| JP | 2005531265 | 10/2005 |
| JP | 2006503481 | 1/2006 |
| JP | 2006505146 | 2/2006 |
| KR | 20040004261 A | 1/2004 |
| KR | 100610929 | 8/2006 |
| RU | 2120702 C1 | 10/1998 |
| WO | WO9214339 | 8/1992 |
| WO | WO9715991 | 5/1997 |
| WO | WO9734434 | 9/1997 |
| WO | WO9858461 A1 | 12/1998 |
| WO | WO9959264 A2 | 11/1999 |
| WO | WO0050971 A2 | 8/2000 |
| WO | WO0152447 | 7/2001 |
| WO | WO0182512 A1 | 11/2001 |
| WO | WO0199308 | 12/2001 |
| WO | WO0208857 A2 | 1/2002 |
| WO | WO0217572 A2 | 2/2002 |
| WO | WO03013005 A2 | 2/2003 |

| | | |
|---|---|---|
| WO | WO04001892 | 12/2003 |
| WO | WO04001986 A2 | 12/2003 |
| WO | WO04002014 | 12/2003 |
| WO | WO04002014 A1 | 12/2003 |
| WO | WO2004004365 A2 | 1/2004 |
| WO | WO2004032362 | 4/2004 |
| WO | WO2004036789 | 4/2004 |
| WO | WO2004038958 | 5/2004 |
| WO | WO2004062305 A1 | 7/2004 |
| WO | WO2005115022 | 12/2005 |

OTHER PUBLICATIONS

Written Opinion, PCT/US06/02900, International Search Authority, European Patent Office, May 13, 2008.
Code of Federal Regulations, Title 47 Telecommunication; "Federal Communications Commission code part 15.407," Federal Communications Commission vol. 1, chapter I, part 15.407.
First Office Action issued from the Chinese Patent Office in connection with corresponding Chinese application No. 200380101286.2.
Draft IEEE Standard for Local and Metropolitan Area Networks—Part 16: Air Interface for Fixed and Mobile Broadband Wireless Access Systems; Amendment for Physical and Medium Access Control Layers for Combined Fixed and Mobile Operation in Licensed Bands. IEEE P802.16E/D12, Oct. 2005.
European Search Opinion—EP08004269, Search Authority—The Hague, Apr. 15, 2008.
European Search Report—EP03781739, Search Authority—Munich Patent Office, May 7, 2010.
European Search Report—EP05750008, Search Authority—Munich Patent Office, Jun. 10, 2010.
European Search Report—EP05758871, Search Authority—Munich Patent Office, Jun. 11, 2010.
IEEE Std 802.11-1999 (Reaff 2003), "Part 11: Wireless LAN Medium Access Control (MAC) and Physical Layer (PHY) Specifications," LAN MAN Standards Committee of the IEEE Computer Society; Paragraphs 7.2.3.1 and 7.2.3.9; Paragraph 7.3.2.4; Paragraphs 15.4.6.2 and 18.4.6.2.
IEEE Std 802.11g-2003, "Part 11: Wireless LAN Medium Access Control (MAC) and Physical Layer (PHY) specifications: Amendment 4: Further Higher Data Rate Extension in the 2.4 GHz Band," IEEE Computer Society, Published by The Institute of Electrical and Electronics Engineers, Inc., Jun. 27, 2003.
International Preliminary Report on Patentability—PCT/US06/002508, The International Bureau of WIPO, Geneva, Switzerland, Jul. 29, 2008.
International Preliminary Report on Patentability—PCT/US07/007978, The International Bureau of WIPO—Geneva, Switzerland, Oct. 30, 2008.
International Preliminary Report on Patentability—PCT/US2005/019585, International Preliminary Examining Authority/US-Alexandria, Virginia—May 14, 2007.
International Search Report—PCT/US06/002508—ISA/US Mar. 5, 2007.
International Search Report—PCT/US06/45123—ISA/EPO—Nov. 2, 2007.
Translation of Office Action in Japanese application 2004-515701, corresponding to U.S. Appl. No. 10/516,327, citing WO00050971, JP2000-031877, JP2002-033691, JP2002-111571 and JP11-127104. Dated May 25, 2010.
Translation of Office Action in Japanese application 2004-565505, corresponding to U.S. Appl. No. 10/563,471, citing JP08-097762, JP2001-111575, JP09-018484 and JP11-055713. Dated Sep. 14, 2010.
Translation of Office Action in Japanese application 2009-503041, corresponding to U.S. Appl. No. 11/730,361, citing W005115022, JP10-135892, JP2005-531265, 2006-503481, JP2005-531202 and JP2006-505146 . Dated Oct. 26, 2010.
Translation of Office Action in Korean application 2008-7026775, corresponding to U.S. Appl. No. 11/730,361, citing KR100610929 Dated Aug. 30, 2010.
Translation of Office Action in Korean application 2009-7010639, corresponding to U.S. Appl. No. 12/439,018, citing WO01052447 and US20040208258 Dated Nov. 15, 2010.

Andrisano, et al., On the Spectral Efficiency of CPM Systems over Real Channel in the Presence of Adjacent Channel and CoChannel Interference: A Comparison between Partial and Full Response Systems, IEEE Transactions on Vehicular Technology, vol. 39, No. 2, May 1990.
Draft Corrigendum to IEEE Standard for Local and Metropolitan Area Networks—Part 16: Air Interface for Fixed Broadband Wireless Access Systems, IEEE P802.16-2004/Cor1/D5.
First Report issued by IP Australia on Jul. 31, 2007 in connection with the corresponding Australian application No. 2003239577. (corresponding U.S. Appl. No. 10/516,327).
IEEE 802.16(e), Part 16: Air Interface for Fixed Broadband Wireless Access Systems, 2005, Sections 8.4.10.2.1; 8.4.10.3.2.
IEEE Std 802.11-1999 (Reaff 2003), "Part 11: Wireless LAN Medium Access Control (MAC) and Physical Layer (PHY) Specifications," LAN MAN Standards Committee of the IEEE Computer Society; Paragraphs 7.2.3.1 and 7.2.3.9; Paragraph 7.3.2.4; Paragraphs 15.4.6.2 and 18.4.6.2.
IEEE Std 802.11b-1999, "Part 11: Wireless LAN Medium Access Control (MAC) and Physical Layer (PHY) specifications: Higher-Speed Physical Layer Extension in the 2.4 GHz Band," IEEE-SA Standards Board, Supplement to ANSI/IEEE Std. 802.11, 1999 Edition, Approved Sep. 16, 1999.
IEEE Std 802.11g-2003, Part 11: Wireless LAN Medium Access Control (MAC) and Physical Layer (PHY) specifications: Amendment 4: Further Higher Data Rate Extension.
In the 2.4 GHz Band, IEEE Computer Society, Published by The Institute of Electrical and Electronics Engineers, Inc., Jun. 27, 2003.
IEEE Std 802.16-2001; "Part 16: Air Interface for Fixed Broadband Wireless Access Systems," IEEE Computer Society and the IEEE Microwave Theory and Techniques Society, Published by The Institute of Electrical and Electronics Engineers, Inc., Apr. 8, 2002.
Kannangara, et al.. "Analysis of an Adaptive Wideband Duplexer with Double-Loop Cancellation," IEEE Transactions on Vehicular Technology, vol. 56, No. 4, Jul. 2007, pp. 1971-1982.
Kutlu et al., "Performance Analysis of MAC Protocols for Wireless Control Area Network," 1996 IEEE, pp. 494-499.
Mexican Office communication dated Jul. 2, 2007 issued from Mexican Patent Office for application PA/a/2004/011588 with partial translation thereof, (corresponding U.S. Appl. No. 10/516,327).
Notification of the First Office Action from Chinese Patent Office dates Sep. 8, 2006 for the corresponding Chinese patent application No. 200380105267.7. (corresponding U.S. Appl. No. 10/536,471).
Office Action issued from the Mexican Patent Office dated Feb. 22, 2008 in connection with the corresponding Mexican Patent Application No. PA/a/2004/011588. (corresponding U.S. Appl. No. 10/516,327).
Office communication dated Jan. 12, 2007 issued from the European Patent Office for counterpart application No. 03734136.9-1246. (corresponding U.S. Appl. No. 10/516,327).
Office communication dated Oct. 19, 2006 issued from the Mexican Patent Office for counterpart application No. PA/a/2004/011588. (corresponding U.S. Appl. No. 10/516,327).
Official communication issued from the European Patent Office dated Aug. 7, 2007 for the corresponding European patent application No. 03759271.4-2412. (corresponding U.S. Appl. No. 10/531,078).
Official communication issued from the European Patent Office dated Dec. 19, 2006 for the corresponding European patent application No. 03759271-4-2412.
Second Office Action issued from the Chinese Patent Office on Jul. 20, 2007 in connection with corresponding Chinese application No. 200380101286.2. (corresponding, U.S. App. No. 10/530,546).
Specifications for2.3 GHz Band Portable Internet Service—Physical & Medium Access Control Layer, TTAS.KO-06.0082/R1, Dec. 2005.
Third Office Action issued from the Patent Office of People's Republic of China dated Jan. 4, 2008 in corresponding Chinese Patent Application No. 200380101286.2. (corresponding U.S. Appl. No. 10/530,546).
Translation of Office Action issued by Chinese Patent Office on Oct. 19, 2007 in connection with the corresponding Chinese application No. 03814391.7. (corresponding U.S. Appl. No. 10/516,327).

U.S. PTO Office Action mailed on Apr. 17, 2007 for the corresponding parent patent U.S. Appl. No. 11/339,838, now U.S. Patent No. 7,230,935.

U.S. PTO Office Action mailed on Jan. 24, 2007 for the corresponding parent patent U.S. Appl. No. 11/339,838, now U.S. Patent No. 7,230,935.

U.S. PTO Office Action mailed on Nov. 21, 2006 for the corresponding parent patent U.S. Appl. No. 11/339,838, now U.S. Patent No. 7,230,935.

U.S. PTO Office Action mailed on Nov. 6, 2006 for the corresponding parent patent U.S. Appl. No. 11/339,838, now U.S. Patent No. 7,230,935.

Translation of Office Action in Japanese application 2007-513349 corresponding to U.S. Appl. No. 11/546,242, citing WO04032362, WO2004001986, JP09214418, JP07131401, JP2004056210, JP2000082983, JP09130322, JP2003244050, JP2003198442, US6377612, JP2006503481, JP2002111571, JP09162801, JP2005531202, WO2004001892 and JP10107727 dated Nov. 16, 2010.

Translation of Office Action in Japanese application 2009-526736 corresponding to U.S. Appl. No. 12/307,801, citing US20040110469, US20060019603, JP2005072646, JP2001016152, JP11298421, JP2001136115, JP2005110150, JP2005236626, WO9715991 and WO0199308 dated Jan. 4, 2011.

International Search Report—PCT/US03/016208—ISA/US—Nov. 6, 2003.

International Search Report—PCT/US03/029117—ISA/US—Feb. 13, 2004.

International Search Report—PCT/US03/029130—ISA/US—Jan. 24, 2004.

International Search Report—PCT/US03/031515—ISA/US—Apr. 14, 2004.

International Search Report—PCT/US04/007708—ISA/US—Oct. 18, 2004.

International Search Report—PCT/US05/016592—ISA/US—Jun. 28, 2006.

International Search Report—PCT/US06/002899—ISA/US—Apr. 6, 2007.

International Search Report—PCT/US07/007978—ISA/US—Sep. 24, 2008.

International Search Report—PCT/US2003/035050—ISA/US—May 21, 2004.

International Search Report—PCT/US2005/019585—ISA/US—May 22, 2006.

International Search Report and Written Opinion—PCT/US07/019163—ISA/US—Sep. 10, 2008.

International Search Report and Written Opinion—PCT/US07/022743—ISA/EPO Mar. 17, 2008.

International Search Report and Written Opinion—PCT/US2006/022075—ISA/US Oct. 24, 2007.

International Search Report—PCT/US03/039889—ISA/US—May 19, 2004.

Office Action English translation dated Jul. 4, 2008 issued from Chinese Patent Office for Application No. 03814391.7.

Office Action English translation dated Jun. 29, 2009 issued from Japanese Patent Office for Application No. 2004-541532.

Official communication issued from the European Patent Office dated Dec. 19, 2006 for the corresponding European patent application No. 03759271.4-2412.

Suppplemental European Search Report dated Oct. 9, 2006 issued from European Patent Office for counterpart application No. 03759235.9-2411.

Supplementary European Search Report—EP037559235, The Hague—Sep. 19, 2006.

Supplementary European Search Report—EP03759271, Search Authority—Munich Patent Office, Sep. 14, 2006.

Supplementary European Search Report—EP08004269, Search Authority—The Hague—Apr. 15, 2008.

Translation of Office Action in Japanese application 2004-544751, corresponding to U.S. Appl. No. 10/531,078, citing W000050971, JP2002-111571, JP05-102907, JP63-160442, JP2000-502218, JP10-032557 and JP2000-082983. Dated Oct. 16, 2009.

Translation of Office Action in Japanese application 2004-553510, corresponding to U.S. Appl. No. 10/533,589, citing W000050971 and JP09-182155. Dated Nov. 26, 2009.

Translation of Office Action in Japanese application 2004-565505, corresponding to U.S. Appl. No. 10/563,471, citing JP08-097762 and JP2001-111575. Dated Sep. 9. 2009.

Translation of Office Action in Japanese application 2004-565505, corresponding to U.S. Appl. No. 10/563,471, citing JP09-018484. Dated Mar. 26, 2010.

Written Opinion—PCT/US04/007708—ISA/US—Oct. 18, 2004.
Written Opinion—PCT/US05/016592,—ISA/US—Jun. 28, 2006.
Written Opinion—PCT/US06/002508—ISA/US—Mar. 5, 2007.
Written Opinion—PCT/US07/007978—ISA/US—Sep. 24, 2008.
Written Opinion—PCT/US2005/019585—ISA/US—May 22, 2006.
Written Opinion—PCT/US2006/045123—ISA/EPO—Nov. 2, 2007.

* cited by examiner

PHYSICAL LAYER REPEATER CONFIGURATION FOR INCREASING MIMO PERFORMANCE

CROSS REFERENCE TO RELATED APPLICATION

The present invention is based on and claims priority to U.S. Provisional Application Ser. No. 60/647,386, entitled "PHYSICAL LAYER REPEATER CONFIGURATION FOR INCREASING MIMO PERFORMANCE," filed Jan. 28, 2005, the contents of which are incorporated herein by reference.

FIELD OF THE INVENTION

The present invention relates generally to wireless communications and more specifically to a repeater configuration for increasing the coverage of wireless networks.

BACKGROUND OF THE INVENTION

Several standard protocols for wireless local area networks, commonly referred to as WLANs, are becoming popular. These include protocols such as 802.11 (as set forth in the 802.11 wireless standards), Wi-MAX, and Bluetooth. The standard wireless protocol with the most commercial success to date is the 802.11g protocol.

While the specifications of products utilizing the above standard wireless protocols commonly indicate data rates on the order of, for example, 54 MBPS and ranges on the order of, for example, 100 meters, these performance levels are rarely, if ever, realized. This lack of performance is due to attenuation of the radiation paths of RF signals, which are typically in the range of 2.4 GHz, in an indoor environment. Base to receiver ranges are generally less than the coverage range required in a typical home, and may be as little as 10 to 15 meters. Further, in structures that have split floor plans, such as ranch style or two story homes, or that are constructed of materials that attenuate RF signals, areas in which wireless coverage is needed may be physically separated by distances outside of the range of, for example, an 802.11 protocol based system. Finally, the data rates of the above standard wireless protocols are dependent on the signal strength. As distances in the area of coverage increase, wireless system performance typically decreases.

One way to increase the range of wireless systems is by the use of repeaters. This is a common practice in the mobile wireless industry. One significant complication is that the system receivers and transmitters operate at the same frequency for a WLAN utilizing an 802.11 or an 802.16 WMAN wireless protocol. Such operation is commonly referred to as time division duplexing (TDD). This operation is significantly different than the operation of many cellular repeater systems, such as those systems based on IS-136, IS-95 or IS-2000 standards, where the receive and transmit bands are separated by a duplexing frequency offset. Frequency division duplexing makes the repeater operation easier than in the case where the receiver and transmitter channels are on the same frequency.

There are, however, cellular mobile systems that separate the receive and transmit channels by time rather than by frequency. These systems utilize scheduled times for specific uplink/downlink transmissions. Repeaters for these systems are more easily built, as the transmission and reception times are well known and are broadcast by a base station. Receivers and transmitters for these systems may be isolated by any number of means including physical separation, antenna patterns, or polarization isolation.

The random packet nature of the WLAN protocols provides no defined receive and transmit periods. The packets from each wireless network node are spontaneously generated and transmitted and are not temporally predictable. A protocol referred to as a collision avoidance and random back-off protocol is used to avoid two units transmitting their packets at the same time. For an 802.11 standard protocol, this is referred to as the distributed coordination function (DCF). In the case where the receive and transmit times are known, synchronization of the timing can be problematic and can drive up the expense of the product.

WLAN repeaters have unique constraints due to the above spontaneous transmission capabilities and therefore require a unique solution. Another unique requirement is that, since these repeaters use the same frequency for receive and transmit, some form of isolation must exist between the receiver and transmitter of each repeater. While existing CDMA systems employ directional antennas and physical separation of the receive and transmit antennas to achieve this isolation, such techniques are not practical for WLAN repeaters in many operating environments such as in the home where lengthy cabling is not desirable or may be too costly.

Further, in a WLAN environment utilizing the proposed IEEE 802.11n standard protocol, wireless devices rely on multi-path transmissions to increase data rates and range. However, in a typical home WLAN environment, multi-path transmission capability and spatial diversity are limited for many of the same reasons discussed above in connection with lack of performance of wireless products in a home or indoor environment.

SUMMARY OF THE INVENTION

The present invention provides a wireless network with at least one Multiple Input Multiple Output (MIMO) wireless network station and two or more physical layer repeaters each for receiving wireless signal to or from the at least one MIMO wireless network station and each for re-transmitting the wireless signal while continuing to receive the wireless signal.

In the above wireless network, at least one MIMO wireless network station and the two or more physical layer repeaters may operate according to a protocol, such as the proposed 802.11n protocol. Each repeater can receive and transmit a wireless signal from or to the at least one MIMO wireless network station on a first frequency and synchronously re-transmitting the wireless signal while continuing to receive the wireless signal on a second frequency. In addition, the repeaters may be time division duplexed (TDD), or, alternatively, may be frequency division duplexed (FDD), and can be configured to transmit or receive the wireless signals to or from the MIMO wireless network station and re-transmitting the wireless signals in a synchronized manner when operating in a translating mode. In addition, the at least one MIMO wireless network station comprises a frequency translating MIMO wireless network station. It will be appreciated that in accordance with 802.11n proposed standards, in a MIMO environment, an access point configured as a MIMO wireless network station has two or possibly more antenna for transmitting a signal in a diversity like configuration and the MIMO client has two or more receive antenna for diversity reception.

According to another embodiment, the present invention provides a time division duplex (TDD) wireless repeater configuration including a first TDD wireless repeater capable of recognizing that it is operating in a Multiple Input Multiple Output (MIMO) wireless network, and a second TDD wireless repeater spatially separated from the first TDD wireless repeater by a predetermined distance or may be in the same package and may not be physically seperate. The first TDD wireless repeater is capable of identifying a presence of the second TDD wireless repeater, entering into a mode with the second TDD wireless repeater to receive wireless transmissions in a synchronous manner with the second TDD wireless repeater on a same first frequency, and of re-transmitting the wireless transmissions in a manner that is synchronous with the second TDD wireless repeater on a same second frequency. In an alternative embodiment, two or more repeaters may be physically integrated into the same package simplifying synchronization control. In yet another alternative embodiment, the physical layer repeaters can be coupled using telephone wiring or household wiring is described in greater detail in the applications noted below. In still another alternative embodiment, the physical layer repeaters can repeat in a non-frequency translating mode where receive and transmit isolation becomes the key issue. Accordingly, physical separation of the client side and AP side antennae must be achieved using a variety of methods such as using household wiring, again, as discussed in the incorporated applications noted below.

In the above configuration, the first TDD wireless repeater may be a master repeater, and the second TDD wireless repeater a slave repeater. The master repeater, which may be a repeater that is first to be activated, or a repeater having the strongest signal power with respect to a MIMO base station, is for re-transmitting the wireless transmissions independently of the slave repeater, and the slave repeater is for re-transmitting the wireless transmissions only after re-transmission of the wireless transmissions by the master repeater. The master repeater is for communicating a master/slave protocol to the slave repeater that activates the slave repeater in a slave mode. Thereafter, the slave repeater is for re-transmitting the wireless transmissions during periods of MIMO operation as designated by MIMO device generated messages, and the master repeater is for re-transmitting the wireless transmissions during both MIMO and non-MIMO periods of operation. The slave repeater may include an oscillation detection circuit for identifying when a frequency translation direction is erroneously chosen by the master repeater and for terminating re-transmission of the wireless transmissions. The first TDD wireless repeater and the second TDD wireless repeater may also be a first TDD frequency translating wireless repeater and a second TDD frequency translating wireless repeater.

According to yet another embodiment, a time division duplex (TDD) wireless repeater configuration includes a first TDD wireless repeater capable of detecting transmissions from Multiple Input Multiple Output (MIMO) enabled devices in a wireless network, and a second TDD wireless repeater also capable of detecting the transmissions from the MIMO enabled devices. The first TDD wireless repeater and the second TDD wireless repeater begin to re-transmit in a synchronous mode with one another upon at least one of the first TDD wireless repeater and the second TDD wireless repeater detecting the transmissions from the MIMO enabled devices.

DETAILED DESCRIPTION OF THE INVENTION

Figure 1:
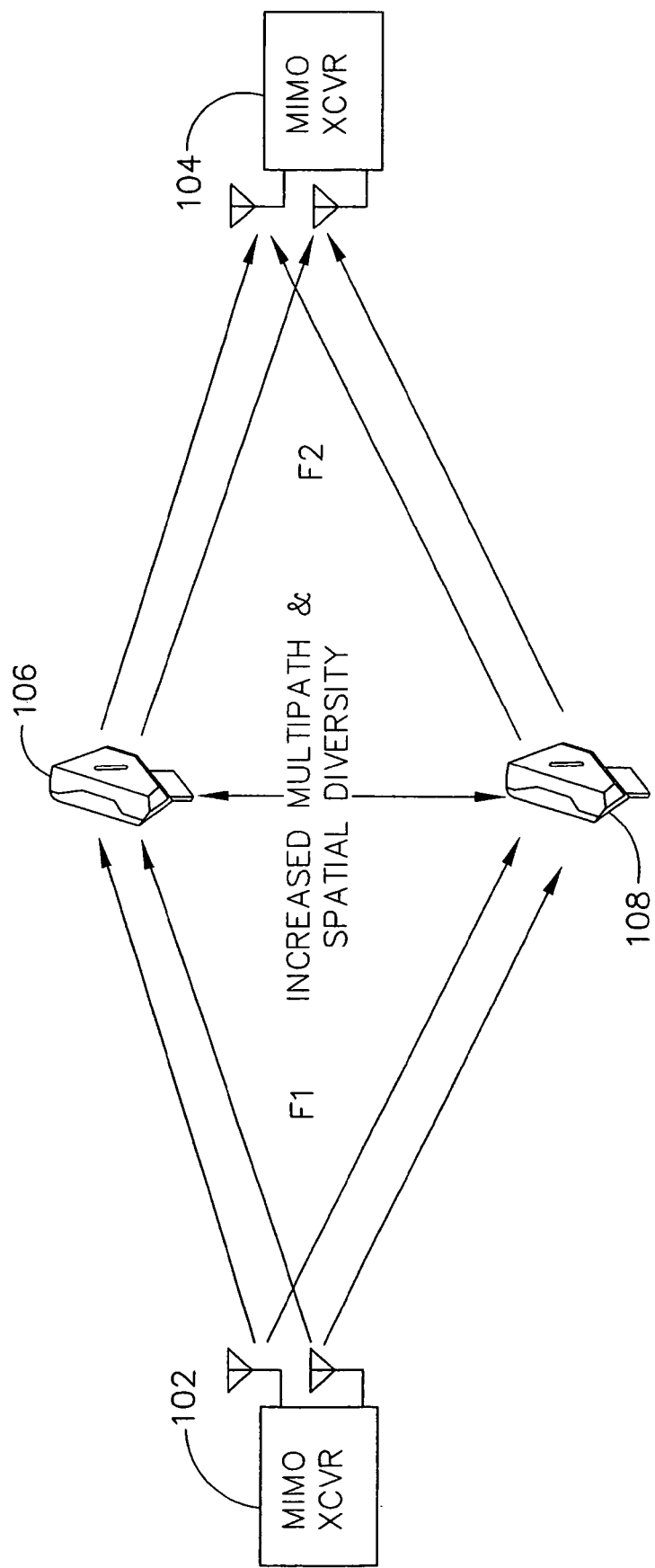
FIG. 1 is a block diagram of a wireless network including a frequency translating physical layer repeater configuration according to a preferred embodiment of the present invention.

FIG. 1 illustrates a multi-input, multi-output (MIMO) protocol-based network (network) 100, such as is described in IEEE 802.11 draft proposals from TGnSync and WWise consortiums (the contents of which are hereby incorporated by reference) that enables consistent independent signal paths to be generated even in environments, such as home environments, in which multi-path transmission capability and spatial diversity are typically limited. MIMO transceivers 102, 104, hereinafter referred to as network stations, may be any type of wireless communications devices including client devices, MIMO-enabled access points, or any other type of known network node capable of operating in MIMO mode and of transmitting and/or receiving data in a wireless environment based on a wireless protocol such as 802.11b, 802.11g, or 802.11n (proposed), in the network 100. The network stations 102, 104 are capable of communicating with one another over distances outside of normal coverage ranges through wireless physical layer repeaters (repeaters) 106, 108.

As will be discussed in detail below, the repeaters 106, 108, which may be either TDD or FDD type frequency translating repeaters, are capable of reacting to the particular protocol implemented in the network 100 in which they operate. In other words, the repeaters 106, 108 are capable of addressing the backwards compatibility issue that will exist in the network, as the network must be capable of enabling both current generation and legacy network stations to communicate regardless of the respective operating protocols of the devices.

The repeaters 106, 108 react based on one of two fundamental modes of synchronous operation. A first exemplary mode of operation is a physical layer mode of operation in which the repeaters 106, 108 operate in a master/slave relationship during MIMO signal transmission irrespective of the underlying message protocol. A second mode of operation is a protocol based mode of operation in which the repeaters 106, 108 may or may not operate in a master/slave relationship and are triggered into MIMO operation based on an underlying protocol detected during MIMO transmissions to/from network stations that are communicating in the network 100. Regardless of the mode of operation, a repeater is dedicated as a master repeater based on, for example, it being the first repeater to be activated, or it being the repeater having the strongest signal power with respect to a MIMO base station (not shown), with all other repeaters automatically being designated as slave repeaters. In addition, the repeater operating as the slave repeater preferably includes an oscillation detection circuit for identifying when a frequency translation direction is erroneously chosen by the master repeater and for terminating re-transmission of the wireless transmissions. Each of these modes of operation will be discussed below in detail.

Figure 2:
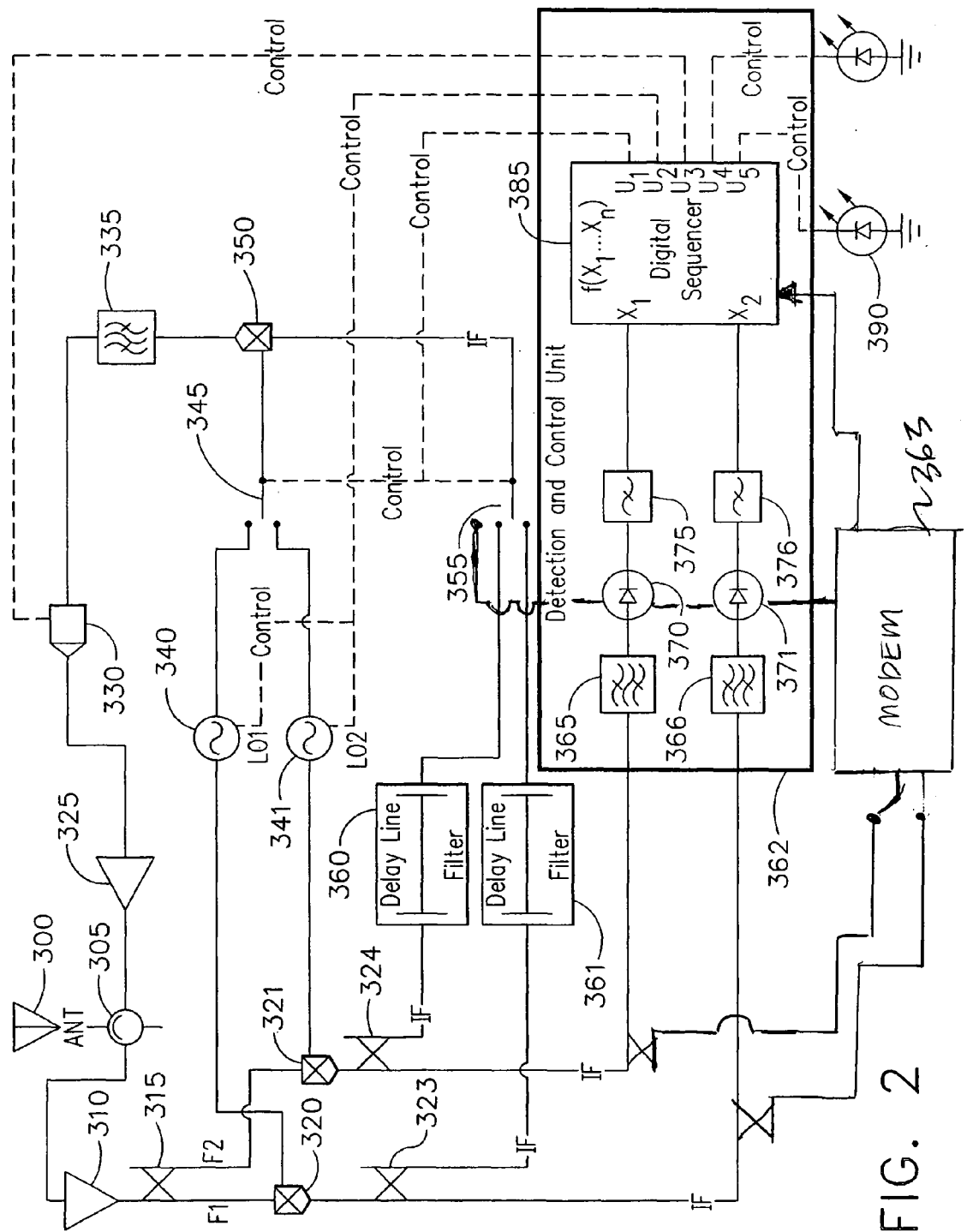
FIG. 2 is a schematic block diagram of a frequency translating physical layer repeater such as those shown in FIG. 1.

FIG. 2 is an exemplary system diagram 200 showing the components of the wireless repeaters 106, 108 when the repeaters 106, 108 are designed to operate in the above-mentioned physical layer mode of operation. Key features of the wireless repeaters 106, 108 are the ability receive a signal and translate the frequency of the received signal from a first bi-directional frequency (F1) to a second bi-directional frequency (F2), or vice versa, with very little distortion of the signal. This is made possible by fast signal detection and delay of the received signal long enough to determine proper control actions.

Radio waves propagate from various wireless devices such as the network stations 102, 104 in FIG. 1 and become incident to antenna 300, which, as is known to those of ordinary skill in the art, is an electromagnetic to voltage transducer. In a preferred embodiment this could be a single omni directional antenna tuned and matched to the frequencies of interest. Other embodiments could include, but are not limited to, directional planar antennas, dual antenna elements, polarized antenna elements and directional arrays.

The antenna 300 shown in FIG. 2 transforms received radio waves to a voltage signal and feeds the voltage signal to an isolator 305. Alternatively, the isolator 305 may not be included depending upon the type of antenna configuration utilized. Two such antenna configurations will be described below. The isolator 305 allows a signal to pass from the antenna 300 to a Low Noise Amplifier (LNA) 310 and from a power amplifier 325 to the antenna 300, but blocks or isolates the LNA 310 from the power amplifier 325. Other embodiments of the isolator 305 could include, but are not limited to, circulators, directional couplers, splitters, and switches. A signal received and transformed by the antenna 300 that passes through the isolator 305 is fed to the LNA 310, which amplifies the signal and sets the noise level at that point. A signal amplified by the LNA 310 is fed to an RF splitter 315, which performs an RF power splitting, or coupling, function on the signal to split the signal into two different paths. The splitter 315 could also be a directional coupler or any device that can separate one signal into two signals.

At this point, one skilled in the art will readily recognize that the antenna 300, the LNA 310 and the RF splitter 315 are the primary components forming a receiver. Further, one skilled in the art will readily recognize that the antenna 300, the power amplifier 325, the amplifier 330, the filter 335, the switch 345 and the mixer 350 are the primary components forming a transmitter.

Mixers 320, 321 are frequency conversion devices that mix signals passed from the splitter 315 with signals output from the local oscillators 340, 341 at respective frequencies designated as LO1, LO2 to produce intermediate frequency (IF) or typically lower frequency signals. The local oscillators 340, 341 are tuned to the different frequencies LO1, LO2 such that two different signals at two different frequencies fed from the splitter 315 can be converted to a common IF frequency. For example, if signals at two different frequencies F1=2.412 GHz and F2=2.462 are output from the splitter 315 to the mixers 320, 321, respectively, and assuming the mixer 320 is performing a low side mixing function and the mixer 321 is performing a high side mixing function, then with the local oscillator 340 tuned to LO1=2.342 GHz and the local oscillator 341 tuned to LO2=2.532 GHz and providing inputs to the mixers 320, 321, respectively, the signals output from mixers 320, 321 would each have their frequencies transformed to an IF of 70 MHz.

The splitters 323, 324, which operate the same as the splitter 315 described above, separate the IF signals output from the respective mixers 320, 321 into two different paths. One path from each of the splitters 323, 324 goes to filters 360, 361, respectively, while the other path from each of the splitters 323, 324 goes to filters 365, 366, respectively.

The filters 360, 361, which are preferably band pass filters with delays, remove all outputs from the mixing operation except the desired frequency components. Preferably, the filters 360, 361 have a sufficient time delay such that the detection and control unit 362 can detect which of the two RF frequencies is present and perform control functions described below prior to the signals being available at the output of the filters 360, 361, as detectors 370, 371 are in parallel with the delay filters 360, 361. Methods of delaying electrical signals are well known to those of ordinary skill in the art, and include but are not limited to Surface Acoustic Wave (SAW) devices and the like. However, if it is acceptable to truncate a portion of the first part of the RF signal, then the filters 360, 361 would not need specified delays.

One skilled in the art will readily recognize that the mixers 320, 321, the splitters 323, 324 and the filters 360, 361 are the primary components forming a frequency converter.

The filters 365, 366 in the detection and control unit 362 also perform the same type of band pass filtering as the filters 360, 361. The main difference is that the filters 365, 366 are preferably fast filters without specified long time delays. Additionally, the filters 365, 366 preferably do not require the same level of filtering performance as the filters 360, 361, although one skilled in the art would recognize that varying filter performance within the confines of performing the filtering objective is a design choice. One skilled in the art would also recognize that filters or devices other than band pass filters might be used to perform the above discussed band pass functions.

Power detectors 370, 371 are simple power detection devices that detect if a signal is present on either of the respective frequencies F1, F2 and provide a proportional voltage output if the signal is present. Many types of analog detectors that perform this function may be used. For example, such detectors could include, but are not limited to, diode detectors. Such diode detection could be performed at RF, IF or base band. Detectors providing higher performance than simple power detectors may be used as well. These detectors may be implemented as matched filtering at RF or IF using SAW devices, and matched filtering or correlation at base band after analog to digital conversion. The power detectors 370, 371 are utilized to determine the presence of a wireless transmission on one of the two IF channels by comparing signals on the two IF channels with a threshold. Such a threshold could be predetermined or calculated based on monitoring the channels over time to establish a noise floor.

Further, the power detectors 370, 371 may be used to determine start and stop times of a detected transmission. The proportional voltage output by one of the power detectors 370, 371 in response to signal detection will be used by the digital sequencer 385 to detect whether a received signal is on F1 or F2 and to control the retransmission of the signal as is described below. One of ordinary skill in the art will recognize that the power detection can be placed earlier or later in the signal processing path, as it is possible to detect signals so that the retransmission process may be switched on or off. Further, one of ordinary skill in the art will recognize that techniques for determining or limiting transmission time can be employed, including but not limited to placing a time limit on retransmission using a timer.

The filters 375, 376 are low pass filters and preferably have narrower bandwidths than the filters 365, 366. The filters 375, 376 are required to remove the high frequency components that remain after signal detection in the power detectors 370, 371 and to provide an increase in signal to noise ratio by providing processing gain by reducing the detection signal bandwidth. The signals output from low pass filters 375, 376 are input to the digital sequencer 385, which is configured to detect the presence of the received signal on either F1 or F2 based on appropriate control functions discussed below. The digital sequencer has the ability to transmit and receive (TX/RX), as it includes a modem that is capable of monitoring MIMO-based protocol messaging between nodes in the network 100. In addition, the digital sequencer 385 is capable of communicating with other like repeaters through an 802.11, or similar, protocol.

Feedback to a user can be controlled by the digital sequencer 385 via an indicator 390 which could be, but is not limited to, a series of light emitting diodes. Feedback to the user could be an indication that the wireless repeaters 106, 108 is in an acceptable location such that either or both frequencies F1, F2 from the wireless access point 100 and the network station 105 can be detected, or that power is supplied to the wireless repeaters 106, 108.

Once either of the frequencies F1, F2 is detected, the digital sequencer 385 controls switches 345, 355. The switch 355 is switched to allow the detected signal, either on F1 or F2, which is at an IF frequency, to be routed to the input of a frequency converter 350, which is another frequency translation device similar to the mixers 320, 321. Additionally, the digital sequencer 385 will set the switch 345 to allow a signal from the appropriate one of the local oscillators 340, 341 to be routed to the mixer 350 so that the IF frequency at the input to the frequency converter 350 is translated to the proper frequency at the output thereof.

While many of the concepts herein are discussed and described herein in connection with frequency translating repeaters, it will be appreciated that, in alternative embodiments, a non-frequency translating approach may be used. Further, such approaches may be used in connection with the use of household wiring as described in co-pending U.S. patent application Ser. No. 10/465,817 entitled "WIRELESS LOCAL AREA NETWORK USING EXISTING WIRING AND WIRELESS REPEATER MODULES," and under protocols such as 802.16 as described for example, in co-pending U.S. patent application Ser. No. 11/127,320 entitled "NON-FREQUENCY TRANSLATING REPEATER WITH DETECTION AND MEDIA ACCESS CONTROL," the contents of both applications being incorporated herein by reference.

It should be noted that problems can arise in terms of frequency error in a MIMO scenario where two or more repeaters are used to repeat a signal from a first frequency channel to a second frequency channel due to variance in local oscillator or reference frequencies. Since the error level in the typical LO is in the order of 10-30 ppm, normal repeater operations produce an error proportional to the net frequency. For example, if the repeater is repeating a signal of 2.4 GHz, a 10 ppm frequency error in the LO results in a 24 KHz frequency error in the signal. Such error is relatively small in proportion to the base frequency and, for single repeater operations, can be handled internally within the repeater with negligible effect. However, when the error is transmitted to another repeater with its own error, the potential clock variance of 10-30 ppm of the second repeater becomes more significant relative to the error transmitted from the first repeater and problems can arise due to the cascading frequency error.

One solution to the above noted problem is to determine a frequency offset of the incoming signal. It will be appreciated that the frequency offset or frequency offset estimate value is often available as a standard output of a typical MODEM or MODEM section of a wireless receiver such as a MODEM 363. The MODEM 363 is configured to be selectively coupled to one of the intermediate frequency signal lines, such as the output of mixers 320 and 321. The MODEM 363 is also coupled on the output side to control switch 355. The frequency offset output of the MODEM 363 can be coupled to the detection and control unit 362 and in particular is coupled to the digital sequencer 385. When a frequency offset is determined, it can be used to correct or synchronize the receiving repeater to the transmitting repeater so that the end-to-end frequency error is reduced, minimized, or otherwise eliminated. Various approaches can be used such as open loop control or closed loop control using the frequency offset value or estimate. A loop filter can further be included to minimize noise values in the error estimate and/or the error estimate can be integrated over a time interval to remove at least transient noise, as is well understood in the art. The corresponding one of local oscillator 340 and 341 corresponding to the detected frequency and to the transmitter section can be adjusted using control lines as shown, for example, in FIG. 2. As will be appreciated the local oscillator can be a tunable frequency synthesizer, a voltage controller oscillator (VCO), or some other type of local reference.

An example of operation of the wireless repeaters 106, 108 will now be described using the frequency in the previous examples: F1=2.412 GHz; F2=2.462 GHzIF=70 MHz; LO1=2.342 GHz; and LO2=2.532 GHz. Assume F1 is detected and is output from the filter 361. The switch 355 is set to receive its input from the filter 361, which is F1 translated to 70 MHz. Since it is desired to retransmit F1 at F2=2.462 GHz, then the switch 345 is connected to the signal from the local oscillator 341. The output of the frequency translator 350 includes two components (LO2−IF) and (LO2+IF). The desired component is LO2−IF or 2.532 GHz− 70 MHz=2.462 GHz. Since the frequency translator 350 produces the sum and difference of switch 345 output and switch 355 output, then a filter 335 is required to remove the undesirable term. In the example above, the undesirable term would be LO2+IF or 2.602 GHZ.

The filter 335 performs the required filtering operations. The same is true if F2 was detected. A sum and difference product will occur, and the filter 335 must filter out the undesirable component. The translated and filtered version of the received signal is applied to the amplifier 330, which is preferably a variable gain amplifier. The amplifier 330 applies a variable amount of gain under control of the digital sequencer 385 to make sure that the signal being feed to the amplifier 325 is in the target transmit power range. The amplifier 325 is preferably the final power amplification stage for the transmit signal. It feeds its output to the isolator 305, which then sends the signal to the antenna 300. The signal is then converted back to an electromagnetic field or radio wave by the antenna 300 in a manner well known to those of ordinary skill in the art. This radio wave is a frequency translated and power amplified version of what was received by the antenna 300.

The above descriptions and example assumes frequencies F1 and F2. It is also possible to operate with any frequencies F1 and F2 by moving the frequencies LO1, LO2 of the local oscillators 340, 341 to different defined channels and checking for power detection at those channels. Once the channels are determined, the digital sequencer 385 will use those frequencies, and all operations will be performed as described above. Control of the frequencies of the local oscillators 340, 341 can be accomplished by the digital sequencer 385 or by user tuning. In the case of user tuning for the control of the selected frequencies, the repeater would have a set of switches (rotary or other) that a technician would set at the time of installation to specify the frequencies of operation.

Those of ordinary skill in the art will recognize that the point at which the input signal is down converted from RF to a digital signal may be altered such that more or fewer functions are performed in the RF domain or the digital domain. Further, multiple devices such as the network stations 102, 104 may be utilized in the present invention. The repeaters 106, 108 will detect and retransmit signals from any of these devices. The network stations 102, 104 communicate with each other within the protocol of a system (such as 802.11n) that provides that the desired recipient of the retransmitted signal is identified. Thus, the repeaters 106, 108 may serve many network stations.

Figure 3:
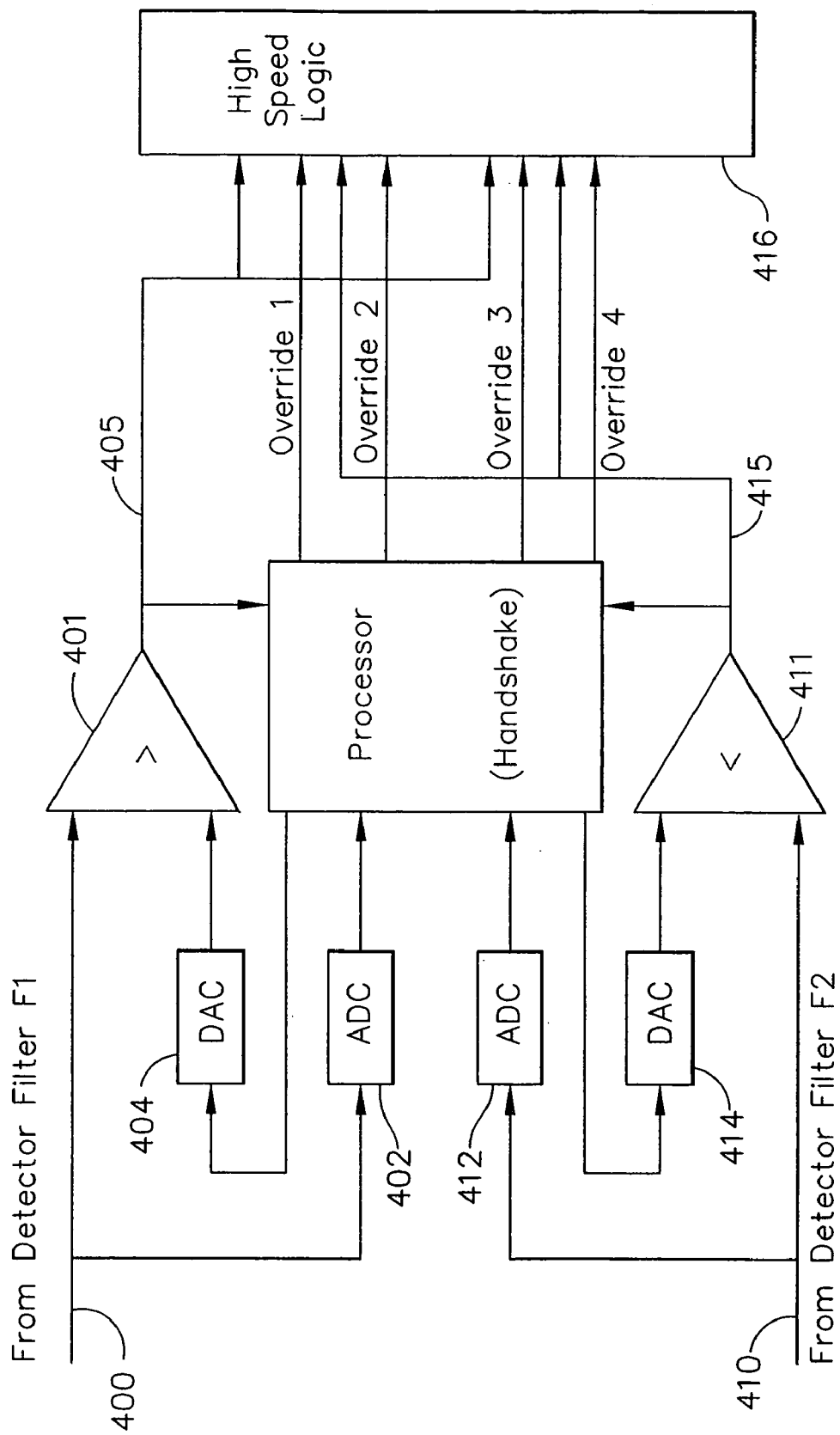
FIG. 3 is a schematic block diagram of the digital sequencer in FIG. 2.

The digital sequencer 385 is shown in more detail in FIG. 3. It will be appreciated that inputs 400, 410 are preferably coupled with the outputs of filter 375 and the filter 376 shown in FIG. 2. Thus, inputs 400, 410 are preferably coupled to threshold comparators 401, 411, respectively. The reference threshold of comparators 401, 411 is preferably set by digital to analog converters (DAC) 404, 414 which may be internal to the digital sequencer 385 or may be provided externally, and may further be simple pulse width modulators or pulse density modulators. The DACs 404, 414 are preferably controlled by a processor 406 and are preferably programmed based upon factors such as, for example, a probability of detection and a probability of false detection as derived by various algorithms known to those of ordinary skill in the art.

Detection algorithms may be based on a statistical analysis of samples of a received signal at ADCs 402, 412 and can include level crossing rates, average multipliers, and the like. Alternatively, a SAW tooth control algorithm may be used to observe the "qualified" false detection rate, for example, on the comparators 401, 411. The SAW tooth control algorithm works by determining when a false detection has occurred and further qualifying the false detection using known parameters of the relevant packet protocol, such as packet duration. If a threshold is crossed for only short periods of time, shorter than the packet duration, a false detection is most probable. It should be noted that valid ranges for packet durations are defined in accordance with protocol standards and specifications, such as 802.11. If a detection interval is too short, the detection cannot be associated with a valid 802.11 packet. If a detection interval is too long, the detection also cannot be associated with a valid 802.11 packet.

Accordingly, it would be likely that in such situations, the detection threshold is set too low, interference may be present, the repeater could be oscillating, or the like. A SAW tooth control algorithm adds an increment to the threshold for the comparator every time a false detection occurs, then subtracts a small amount from the threshold every time there is no detection. It will be appreciated that the relative increments and decrements of the detection threshold level will determine the false alarm rate, and the time constant of the resulting control loop. While SAW tooth control schemes have been effectively used in reverse link "outer loop power control" in, for example, IS-95 CDMA base stations, the application of a SAW tooth control loop to detection in accordance with various exemplary embodiments, provides advantages not previously appreciated.

For detection of signals on the bi-directional frequencies F1 and F2, the output signal 415 from comparator 411 is input to digital logic 416, which produces and outputs a logic 0 when a signal is present on F2. When a signal is present on F1, the output signal 405 from the comparator 401 is input to the digital logic 416, which in turn produces and outputs a logic 1 or high level.

Figure 4:
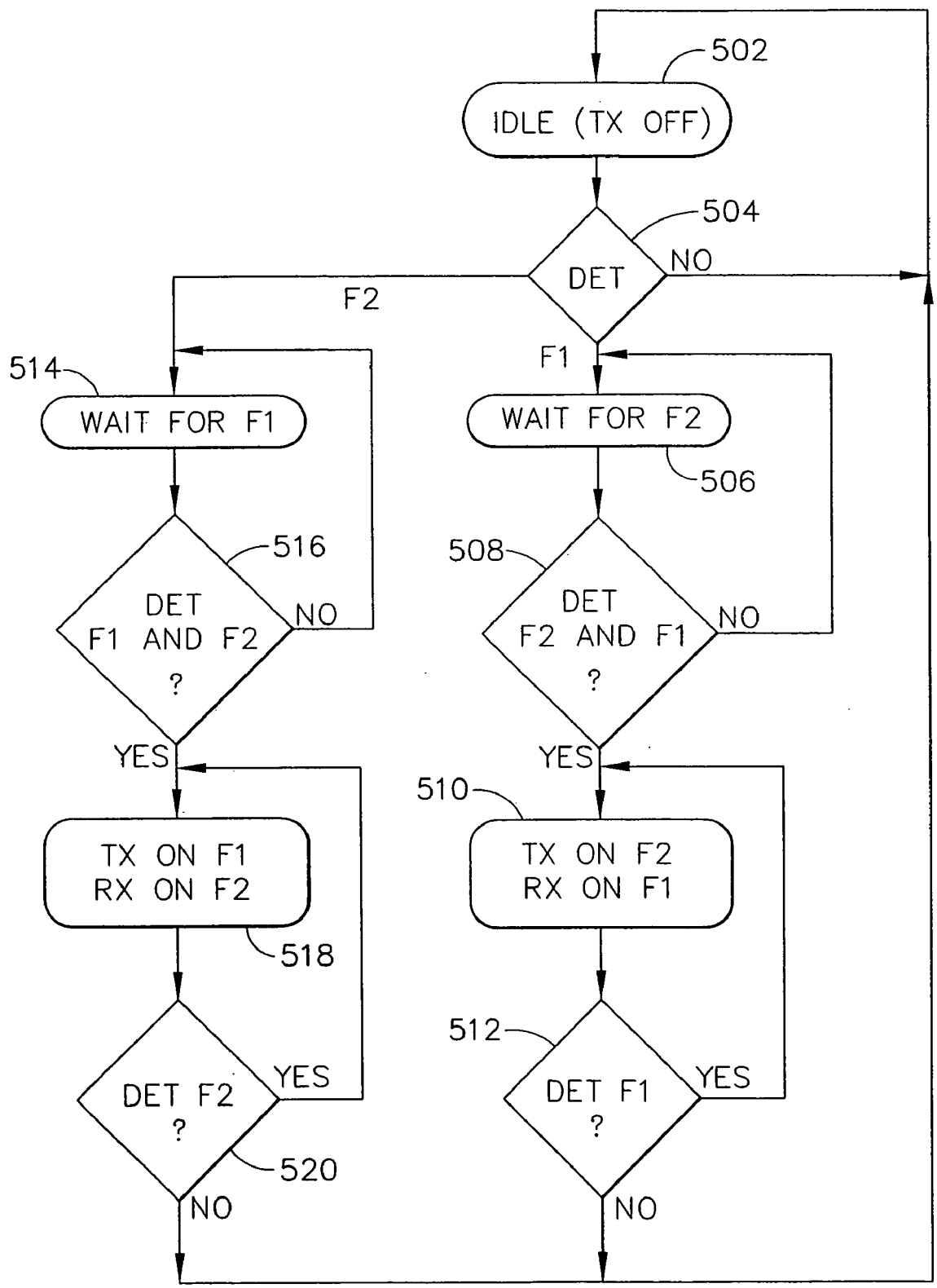
FIG. 4 is a flow diagram illustrating the functions performed by the digital logic shown in FIG. 3 in determining whether a received signal is present on F1 or F2 when repeaters are designed to operate in a physical layer mode of operation during MIMO operation.

FIG. 4 is a flow diagram illustrating the functions performed by the digital logic 416 in determining whether a received signal is present on F1 or F2 when repeaters are designed to operate in the above-discussed physical layer mode of operation during MIMO operation. It will be understood by one skilled in the art that the repeaters 106, 108 when operating in the physical layer synch mode do not listen to the protocol message transmitted by the network stations 102, 104. Rather, the repeaters 106, 108 operate in a master/slave mode in which the master is capable of always functioning in both a normal WLAN and a MIMO repeating mode, and in which the slave repeater must detect signals being received and repeated by the master before being triggered to operate. For purposes of discussion, hereinafter the network station 102 will be referred to as the transmitting network station 102, the network station 104 will be referred to as the receiving network station 104, the repeater 106 will be referred to when applicable as the master repeater 106, and the repeater 108 will be referred to as the slave repeater 108.

As shown at 502 in FIG. 4, the slave repeater 108 is in an idle mode during which its transmit function is off. At 504, the slave repeater 108 determines, by receiving messages from the master repeater 106, whether the master repeater 106 has received an incoming MIMO signal. If the master repeater 106 has received an incoming MIMO signal, the slave repeater 108, through messaging received from the master repeater 108 via the modem in the digital sequencer 385, determines that the signal is transmitted by the transmitting network station 102 on F1, and therefore must be transmitted by both the master repeater 106 and the slave repeater 108 on F2. At 506 and 508, the slave repeater 108 waits until both MIMO signals have been respectively transmitted and received on F2 and F1. Although a slight delay, such as, for example, about 250 ns, is associated with the detection of F2, such delay is considered negligible for purposes of the operation of the repeaters in MIMO mode. Once the presence of received and transmitted MIMO signals is detected on both F1 and F2, at 510 the slave repeater 108 begins to transmit on F2 and to simultaneously receive on F1 in a manner that is synchronous with the master repeater 106, and continues to do so until at 512 it no longer detects the presence of a received signal on F1.

If at 504 it is determined that the MIMO signal is transmitted by the transmitting network station 102 on F2, the MIMO signal therefore must be transmitted by both the master repeater 106 and the slave repeater 108 on F2. At 506 and 508, the slave repeater 108 waits with the above associated delay until both MIMO signals have been respectively transmitted and received on F1 and F2. Once the presence of transmitted and received MIMO signals is detected on both F1 and F2, at 510 the slave repeater 108 begins to transmit on F2 and to receive on F1, and continues until at 512 it no longer detects the presence of a received signal on F1.

In the above physical layer synch approach, both the master and the slave repeaters 106, 108 are capable of operating in MIMO mode to determine the transmit/receive frequencies and the direction in which a MIMO signal is to be transmitted irrespective of the underlying system protocol.

The protocol based mode of MIMO operation will now be discussed with respect to the repeaters 106, 108. The protocol based mode of MIMO operation is based upon the triggering of MIMO operating modes at the master and slave repeaters 106, 108 by network station MIMO transmissions, enable the master and slave repeaters 106, 108 to determine on which frequency the MIMO signals are being transmitted. In connection with the protocol based mode of operation, three methods of determining the repeater transmit direction, hereinafter referred to as Request To Send/Clear To Send (RTS/CTS), Clear to Send To Self (CTS To Self), and encapsulated MIMO packet protocol related methods, will also be discussed.

Figure 5:
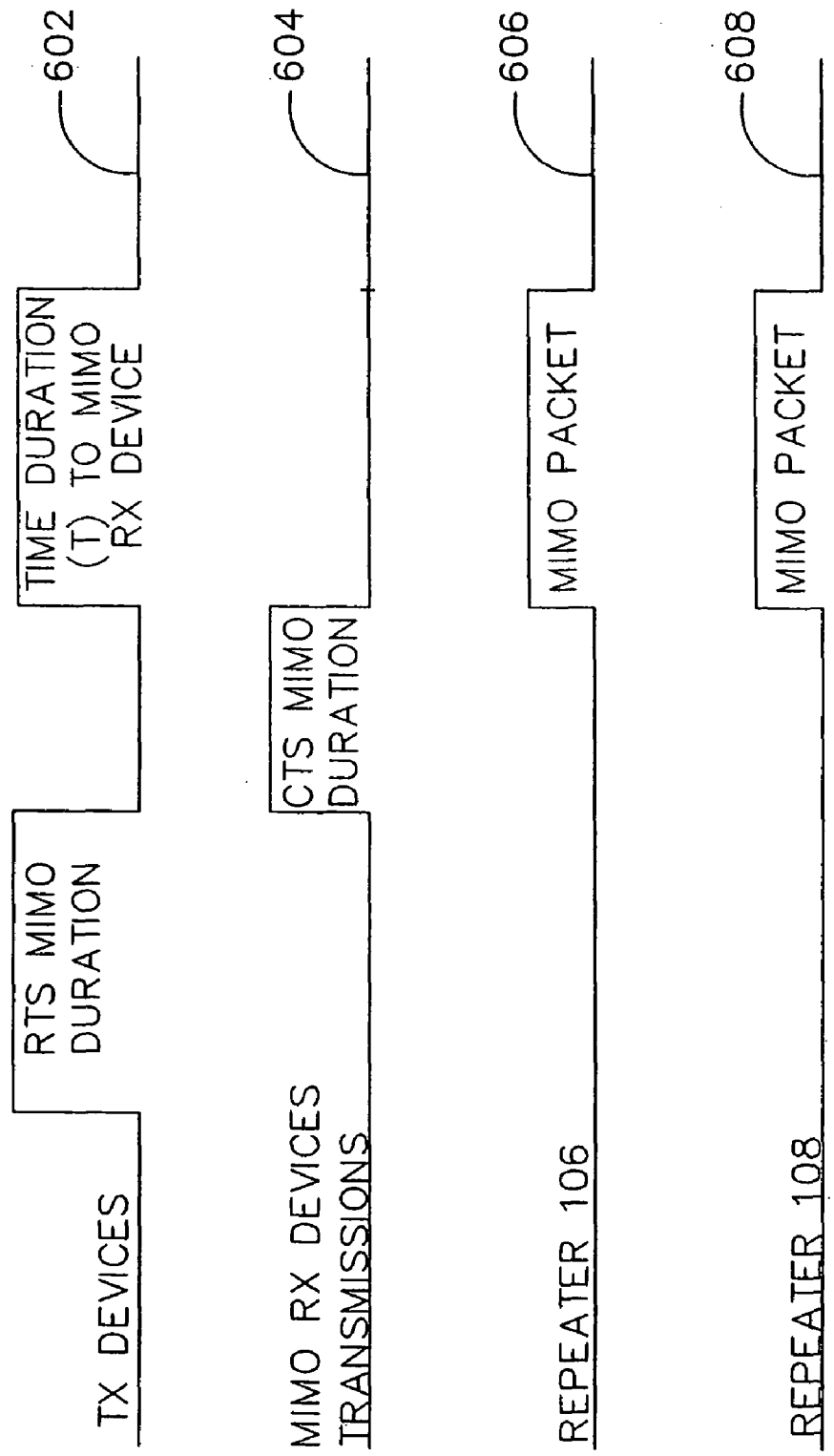
FIG. 5 is a diagram illustrating sequential packet transmission in the network in FIG. 1.

FIG. 5 illustrates the packet transmission sequence of the transmitting network station 102, the receiving network station 104 and the master and slave repeaters 106, 108 as shown in FIG. 1 prior to and during repeater MIMO operation. At 602, the transmitting network station 102 transmits an RTS packet that includes data as to the duration of the MIMO packet to be subsequently sent. The master repeater 106 receives and transmits this RTS packet from the transmitting network station 102 to the receiving network station 104 in a normal WLAN, or non frequency translating, mode. As shown at 604, the receiving network station 104 then transmits a CTS packet that includes data as to the duration that the receiving network station 104 will wait for the MIMO packet to be transmitted from the transmitting network station 102. The master repeater 106 receives and transmits this CTS packet from the receiving network station 104 to the transmitting network station 102 in a normal WLAN, or non-frequency translating, mode.

Subsequently, after the transmitting network station 102 receives the CTS packet, at 602, the transmitting network station then transmits the MIMO packet having a time duration (T), as defined either in the MIMO RTS packet and/or the MIMO CTS packet, to the receiving network station. At 606 and 608, both the master and slave repeaters 106, 108 are triggered and begin to operate in MIMO mode to transmit on F2 MIMO packets received on F1, or vice versa, depending upon the transmission direction, which is determined as follows.

Figure 6:
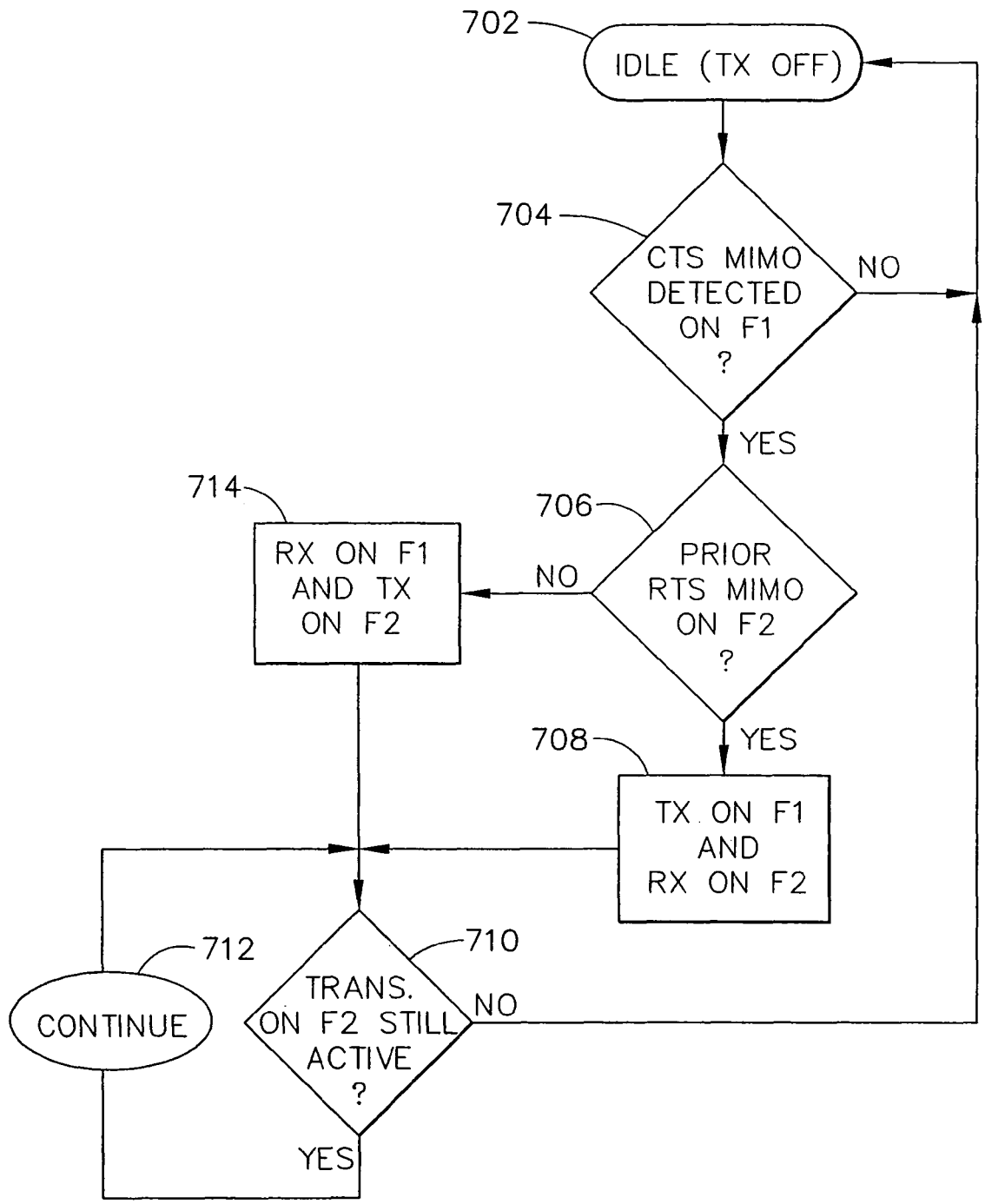
FIG. 6 is a flow diagram illustrating how a master repeater such as that shown in FIG. 1 and operating in MIMO mode determines the direction in which to repeat a MIMO signal based on the transmission, or lack of transmission, of RTS and CTS signals.

FIG. 6 is a flow diagram illustrating how the master repeater 106 operating in MIMO mode determines the direction in which to repeat a MIMO signal based on the transmission, or lack of transmission, of RTS and CTS signals. At 702, the master repeater 106 is in idle mode with its transmit function off. At 704, it detects whether it has received a CTS packet including MIMO duration information transmitted from either the transmitting network station 102 or the receiving network station 104 on F1. If the master repeater 106 detects receipt of the CTS packet, then at 706 the master repeater 106 determines if it had previously received an RTS packet transmitted from the transmitting network station 102 on F2. If so, the master repeater 106 determines that the message indicates that the network 100 is operating in the RTS/CTS Mode in which the client transmitting device 106 transmits the RTS packet, and in which the client receiving device transmits the CTS packet, prior to the client transmitting device 102 transmitting a MIMO signal. Both the master and slave repeaters 106, 108 transmit in a synchronous manner on F1 and receive on F2 as indicated at 708 until the master repeater 106 determines at 710, 712 that F2 is no longer active, or in other words that the MIMO signal is no longer being received. The master repeater 106 communicates with the slave repeater 108 to force the slave repeater 108 to operate in the RTS/CTS Mode.

If at 704 the master repeater 106 determines that it has not received an RTS packet transmitted from the transmitting network station 102 on F2, then the master repeater 106 determines that the network is operating in, for example, a CTS to Self Mode in which the transmitting network station 102 sends the CTS packet to reserve the frequency (F1 or F2) for a predetermined time to send the MIMO signal. Upon determining that the network is operating in the CTS to Self Mode, the master repeater 106 communicates with the slave repeater 108 to force the slave repeater 108 to operate in the CTS To Self Mode in a manner that is synchronous with the operation of the master repeater 108 by turning on its transmitter for the predetermined time indicated by the CTS packet. Therefore, at 710 and 712 both the master and slave repeaters 106, 108 receive on F1 and transmit on F2 until the master repeater 106 determines at 710 that F2 is no longer active.

Figure 7:
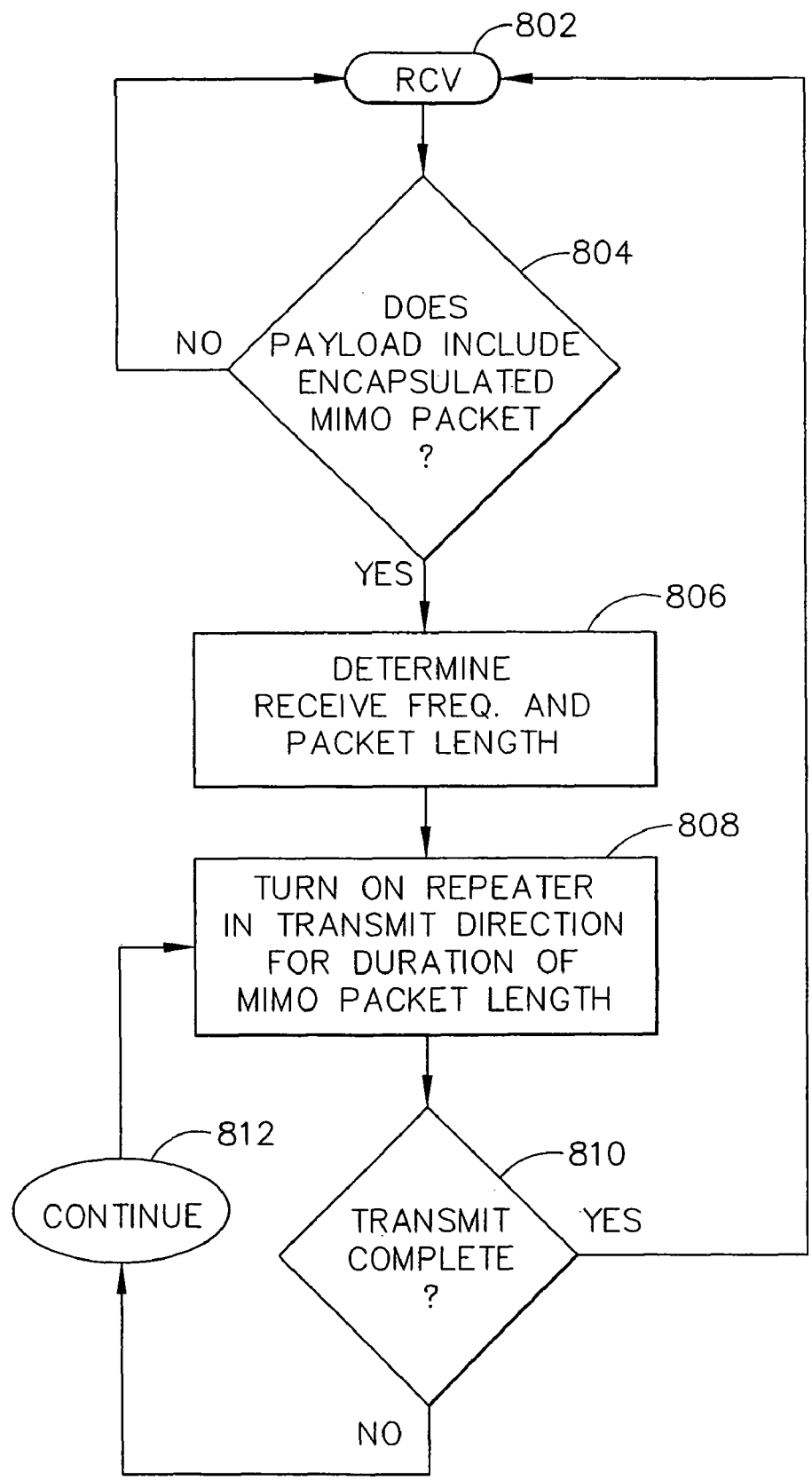
FIG. 7 is a flow diagram illustrating the protocol based synch mode of operation at a slave repeater when a transmit direction is determined based on the contents of MIMO packets encapsulated in payload data packets transmitted from a network station.

FIG. 7 is a flow diagram illustrating how the protocol based synch mode of operation works at the slave repeater 108 when transmit direction is determined based on the contents of MIMO packets encapsulated in payload data packets transmitted from a network station. Such encapsulated MIMO packets enable the master repeater 106 to determine when to initiate MIMO transmission and in what direction to transmit the MIMO packet. The master repeater then continues to transmit non-MIMO as well as MIMO packets even when the slave operates to only transmit MIMO packets.

At 802, the slave repeater 108 operates in normal, non-translating WLAN repeater mode and receives incoming signals. At 804, the slave repeater 108 determines through messaging with the master repeater 106 whether the payload of a received packet includes an encapsulated MIMO packet. If the master repeater 106 determines that the payload does include an encapsulated MIMO packet, at 806 the slave repeater 108 determines based on communication with the master repeater 106 whether the payload was received on F1 or F2, and also determines the length of the payload packet. At 808, the slave repeater 108 turns on in the transmit direction for a duration corresponding to the length of the MIMO packet to transmit (and receive) MIMO packets in a synchronous manner. The slave repeater 108 then monitors the transmission of the encapsulated packet at 810 and continues at 812 to transmit the MIMO packet until the entire encapsulated packet has been sent.

Regarding the above protocols under which the repeaters 106, 108 can be triggered into a protocol based synch mode of operation, the RTS/CTS (and CTS to Self) method of determining transmit direction is preferable during transmission of large data packets, such as for transmission of streaming video. The encapsulated data method of determining transmit direction is preferable when shorter packets are being transmitted, such as in Internet surfing applications.

It should be noted that the network 100 may be alternatively configured using non-frequency translating physical layer repeaters rather than the frequency translating physical layer repeaters 106, 108 as shown in FIG. 1. Instead of utilizing repeaters that operated on the same frequency, non-frequency translating repeaters would be implemented by, for example, using antennas that were separate from the repeaters, by using repeaters with directional antennas, or by reducing the gain of the antennas in conjunction with synch integration.

The invention is described herein in detail with particular reference to presently preferred embodiments. However, it will be understood that variations and modifications can be effected within the scope and spirit of the invention.

What is claimed is:

1. A time division duplex (TDD) wireless repeater configuration, comprising:
a first TDD wireless repeater capable of recognizing that it is operating in a Multiple Input Multiple Output (MIMO) wireless network;
a second TDD wireless repeater spatially separated from the first TDD wireless repeater;
wherein
the first TDD wireless repeater is capable of identifying a presence of the second TDD wireless repeater, entering into a mode with the second TDD wireless repeater to receive wireless transmissions in a synchronous manner with the second TDD wireless repeater on a same first frequency, and of re-transmitting the wireless transmissions in a manner that is synchronous with the second TDD wireless repeater on a same second frequency,
and wherein after MIMO signals are detected on both the same first frequency and the same second frequency, the first TDD wireless repeater is further capable of simultaneously re-transmitting a first portion of the wireless transmissions while receiving a second portion of the wireless transmissions.

2. The TDD wireless repeater configuration of claim 1, wherein the first TDD wireless repeater comprises a master repeater and the second TDD wireless repeater comprises a slave repeater.

3. The TDD wireless repeater configuration of claim 2, wherein the master repeater is adapted to re-transmit the wireless transmissions independently of the slave repeater, and the slave repeater is for re-transmitting the wireless transmissions only after re-transmission of the wireless transmissions by the master repeater.

4. The TDD wireless repeater configuration of claim 3, wherein the master repeater is adapted to communicate a master/slave protocol to the slave repeater to activate the slave repeater in a slave mode.

5. The TDD wireless repeater configuration of claim 2, wherein the slave repeater includes an oscillation detection circuit for identifying whether a frequency translation direction is erroneously chosen by the master repeater and for terminating re-transmission of the wireless transmissions.

6. The TDD wireless repeater configuration of claim 2, wherein the first TDD wireless repeater and the second TDD wireless repeater comprise a first TDD frequency translating wireless repeater and a second TDD frequency translating wireless repeater.

7. The TDD wireless repeater configuration of claim 2, wherein the master repeater comprises a repeater that is first to be activated, or a repeater having the strongest signal power with respect to a MIMO base station.

8. The TDD wireless repeater configuration of claim 2, wherein the first TDD wireless repeater and the second TDD wireless repeater comprise a first TDD non-frequency translating wireless repeater and a second TDD non-frequency translating wireless repeater.

9. The TDD wireless repeater configuration of claim 1, wherein the second TDD wireless repeater is capable of simultaneously re-transmitting the wireless transmissions at the same time as receiving the wireless transmissions.

10. The TDD wireless repeater configuration of claim 1, wherein the first TDD wireless repeater is capable of simultaneously re-transmitting the wireless transmissions on the same first frequency at the same time as receiving the wireless transmissions on the same second frequency.

11. The TDD wireless repeater configuration of claim 1, wherein the first TDD wireless repeater stops transmitting on the second frequency after the first TDD wireless repeater no longer detects the presence of the received signal on the first frequency.

12. A time division duplex (TDD) wireless repeater configuration, comprising:
a first TDD wireless repeater capable of recognizing that it is operating in a Multiple Input Multiple Output (MIMO) wireless network;
a second TDD wireless repeater spatially separated from the first TDD wireless repeater;
wherein
the first TDD wireless repeater is capable of identifying a presence of the second TDD wireless repeater, entering into a mode with the second TDD wireless repeater to receive wireless transmissions in a synchronous manner with the second TDD wireless repeater on a same first frequency, and of re-transmitting the wireless transmissions in a manner that is synchronous with the second TDD wireless repeater on a same second frequency,
wherein the first TDD wireless repeater comprises a master repeater and the second TDD wireless repeater comprises a slave repeater, and
wherein the slave repeater is adapted to re-transmit the wireless transmissions during periods of MIMO operation as designated by MIMO device generated messages, and the master repeater is adapted to re-transmit the wireless transmissions during both MIMO and non-MIMO periods of operation.

13. A time division duplex (TDD) wireless repeater configuration comprising:
a first TDD wireless repeater capable of recognizing that it is operating in a Multiple Input Multiple Output (MIMO) wireless network;
wherein
the first TDD wireless repeater is adapted to identify a presence of a second TDD wireless repeater spatially separated from the first TDD wireless repeater, further adapted to enter into a mode to receive wireless transmissions in a synchronous manner with the second TDD wireless repeater on a same first frequency, and further adapted to re-transmit the wireless transmissions in a manner that is synchronous with the second TDD wireless repeater on a same second frequency
and wherein after MIMO signals are detected on both the first frequency and the second frequency, the first TDD wireless repeater is further capable of simultaneously re-transmitting a first portion of the wireless transmissions while receiving a second portion of the wireless transmissions.

14. The TDD wireless repeater configuration of claim 13, wherein the first TDD wireless repeater comprises a master repeater and the second TDD wireless repeater comprises a slave repeater, and further comprising the second TDD wireless repeater.

15. The TDD wireless repeater configuration of claim 14, wherein the master repeater is adapted to re-transmit the wireless transmissions independently of the slave repeater and the slave repeater is for re-transmitting the wireless transmissions only after re-transmission of the wireless transmissions by the master repeater.

16. The TDD wireless repeater configuration of claim 15, wherein the master repeater is adapted to communicate a master/slave protocol to the slave repeater, wherein the master/slave protocol is adapted to activate a slave mode of the slave repeater.

17. The TDD wireless repeater configuration of claim 14, wherein the slave repeater is adapted to re-transmit the wireless transmissions during periods of MIMO operation as designated by MIMO device generated messages, and the master repeater is adapted to re-transmit the wireless transmissions during both MIMO and non-MIMO periods of operation.

18. The TDD wireless repeater configuration of claim 14, wherein the master repeater comprises a repeater that is first to be activated, or a repeater having the strongest signal power with respect to a MIMO base station.

19. The TDD wireless repeater of claim 14, wherein the slave repeater includes an oscillation detection circuit to identify whether a frequency translation direction is erroneously chosen by the master repeater and to terminate re-transmission of the wireless transmissions.

20. The TDD wireless repeater configuration of claim 14, wherein the first TDD wireless repeater and the second TDD wireless repeater comprise a first TDD frequency translating wireless repeater and a second TDD frequency translating wireless repeater.

21. The TDD wireless repeater configuration of claim 14, wherein the first TDD wireless repeater and the second TDD wireless repeater comprise a first TDD non-frequency translating wireless repeater and a second TDD non-frequency translating wireless repeater.

22. A method of operating a repeater configuration comprising:
   determining, at a first TDD wireless repeater, that it is operating in a Multiple Input Multiple Output (MIMO) wireless network;
   identifying a presence of a second TDD wireless repeater spatially separated from the first TDD wireless repeater; and
   implementing a master slave mode, where implementing the master slave mode comprises:
      receiving wireless transmissions in a synchronous manner with the second TDD wireless repeater on a same first frequency and, after MIMO signals are detected on both a first frequency and a second frequency, simultaneously re-transmitting a first portion of the wireless transmissions while receiving a second portion of the wireless transmissions in a manner that is synchronous with the second TDD wireless repeater on a same second frequency.

23. method of claim 22, wherein the first TDD wireless repeater comprises a master repeater and the second TDD wireless repeater comprises a slave repeater.

24. The method of claim 23, wherein implementing the master slave mode comprises re-transmitting the wireless transmissions at the master repeater independently of the slave repeater and re-transmitting the wireless transmissions at the slave repeater only after re-transmission of the wireless transmissions by the master repeater.

25. The method of claim 23, wherein implementing the master slave mode comprises, at the slave repeater, re-transmitting the wireless transmissions during periods of MIMO operation as designated by MIMO device generated messages, and, at the master repeater, re-transmitting the wireless transmissions during both MIMO and non-MIMO periods of operation.

26. The method of claim 23, further comprising:
   determining at the first repeater that it is first to be activated, or a repeater having the strongest signal power with respect to a MIMO base station; and
   based on the determining, designating the first repeater as the master repeater.

27. The method of claim 23, further comprising:
   at the slave repeater, identifying whether a frequency translation direction is erroneously chosen by the master repeater and terminating re-transmission of the wireless transmissions.

28. The repeater configuration of claim 27, wherein the first TDD wireless repeater comprises a master repeater and the second TDD wireless repeater comprises a slave repeater.

29. A repeater configuration comprising:
   means for determining, at a first TDD wireless repeater, that it is operating in a Multiple Input Multiple Output (MIMO) wireless network;
   means for identifying a presence of a second TDD wireless repeater spatially separated from the first TDD wireless repeater; and
   means for implementing a master slave mode, where means for implementing the master slave mode comprises:
      means for receiving wireless transmissions in a synchronous manner with the second TDD wireless repeater on a same first frequency and, after MIMO signals are detected on both the first same frequency and a second same frequency, simultaneously re-transmitting a first portion of the wireless transmissions while receiving a second portion of the wireless transmissions in a manner that is synchronous with the second TDD wireless repeater on the same second frequency.

30. The repeater configuration of claim 29, wherein means for implementing the master slave mode comprises means for re-transmitting the wireless transmissions at the master repeater independently of the slave repeater and means for re-transmitting the wireless transmissions at the slave repeater only after re-transmission of the wireless transmissions by the master repeater.

31. The repeater configuration of claim 29, wherein means for implementing the master slave mode comprises means for re-transmitting the wireless transmissions during periods of MIMO operation as designated by MIMO device generated messages at the slave repeater, and means for re-transmitting the wireless transmissions during both MIMO and non-MIMO periods of operation at the master repeater.

32. The repeater configuration of claim 29, further comprising:
   means for determining at the first repeater that it is first to be activated, or a repeater having the strongest signal power with respect to a MIMO base station; and
   means for designating the first repeater as the master repeater based on the determining.

33. The repeater configuration of claim 29, further comprising:
   means for identifying whether a frequency translation direction is erroneously chosen by the master repeater and terminating re-transmission of the wireless transmissions at the slave repeater.

34. A device comprising:
   two or more physical layer repeaters to:
   receive a wireless signal transmitted to or received from at least one Multiple Input Multiple Output (MIMO) wireless network station on a first frequency; and
   after MIMO signals are detected on both the first frequency and a second frequency, simultaneously re-transmit said wireless signal on the second frequency while continuing to receive said wireless signal on the first frequency.

35. The device of claim 34, wherein said received wireless signal comprises at least one MIMO packet.

36. The device of claim 35, wherein said received MIMO packet comprises a first plurality of information streams.

37. The device of claim 36, wherein said two or more physical layer repeaters are adapted to support either a MIMO period of operation or a non-MIMO period of operation, based at least in part on receiving said communication.

38. The device of claim 35, wherein said two or more physical layer repeaters comprise time division duplex (TDD) repeaters.

39. The device of claim 38, wherein the two or more TDD repeaters are each adapted to receive the wireless signal and re-transmit the wireless signal in a synchronized manner while operating in a frequency translating mode.

40. The device of claim 38, wherein the two or more TDD repeaters are each adapted to receive the wireless signal and re-transmit the wireless signal in a synchronized manner while operating in a non-frequency translating mode.

41. The device of claim 35, wherein said two or more physical layer repeaters comprise non-frequency translating repeaters.

42. The device of claim 35, wherein said wireless signal is transmitted according to an 802.11n protocol.

43. The device of claim 35, wherein said two or more physical layer repeaters are adapted to receive a communication defining one or more periods of operation for said two or more modes of said wireless protocol.

44. The device of claim 34, wherein said two or more physical layer repeaters are further adapted to retransmit said received MIMO packet as a second plurality of information streams corresponding with said first plurality of information streams.

45. The device of claim 34, wherein said two or more physical layer repeaters are co-located and/or physically integrated in a single package.

46. The device of claim 34, wherein said two or more physical layer repeaters are adapted to support two or more modes of a wireless protocol.

47. The device of claim 34, wherein said two or more physical layer repeaters are adapted to receive a communication defining one or more periods of operation for said two or more modes of said wireless protocol.

48. The device of claim 34, wherein said two or more physical layer repeaters are adapted to support either a MIMO period of operation or a non-MIMO period of operation, based at least in part on receiving said communication.

49. A device comprising:
two or more physical layer repeaters to receive a wireless signal from at least one multiple-input-multiple-output (MIMO) wireless network station and for simultaneously re-transmitting said wireless signal while continuing to receive said wireless signal,
wherein said two or more physical layer repeaters are adapted to receive said wireless signal from said at least one MIMO wireless network station on a first frequency and synchronously re-transmit said wireless signal while continuing to receive said wireless signal on a second frequency, after MIMO signals are detected on both the first frequency and the second frequency.

50. The device of claim 49, wherein said wireless signal is transmitted according to an 802.11n protocol.

51. The device of claim 49, wherein said received wireless signal comprises a MIMO packet.

52. The device of claim 51, wherein said received MIMO packet comprises a first plurality of information streams.

53. The device of claim 52, wherein said two or more physical layer repeaters are further adapted to retransmit said received MIMO packet as a second plurality of information streams corresponding with said first plurality of information streams.

54. The device of claim 49, wherein said two or more physical layer repeaters are co-located and/or physically integrated in a single package.

55. The device of claim 49, wherein said two or more physical layer repeaters comprise time division duplex (TDD) repeaters.

56. The device of claim 55, wherein said TDD repeaters are adapted to re-transmit said wireless signal in a synchronized manner if operating in a frequency translating mode.

57. The device of claim 55, wherein said TDD repeaters are adapted to re-transmit said wireless signal in a synchronized manner if operating in a non-frequency translating mode.

58. The device of claim 49, wherein said two or more physical layer repeaters comprise frequency division duplex (FDD) repeaters.

59. The device of claim 49, wherein said two or more physical layer repeaters comprise non-frequency translating repeaters.

60. The device of claim 49, wherein said two or more physical layer repeaters are adapted to support two or more modes of a wireless protocol.

61. A method comprising:
operating in a multiple-input-multiple-output (MIMO) wireless network at a first time division duplex (TDD) wireless repeater;
identifying a presence of a second TDD wireless repeater that is spatially separated from said first TDD wireless network;
entering into a mode with said second TDD wireless repeater to receive wireless transmissions in a synchronous manner with said second TDD wireless repeater on a same first frequency; and
simultaneously re-transmitting a first portion of said wireless transmissions while receiving a second portion of said wireless transmissions in a manner that is synchronous with said second TDD wireless repeater on a same second frequency, after MIMO signals are detected on both the same first frequency and the same second frequency.

62. The method of claim 61, wherein the first TDD wireless repeater comprises a master repeater and the second TDD wireless repeater comprises a slave repeater.

63. The method of claim 61, wherein the first TDD wireless repeater and the second TDD wireless repeater comprise a first TDD frequency translating wireless repeater and a second TDD frequency translating wireless repeater, respectively.

64. The method of claim 61, wherein the first TDD wireless repeater and the second TDD wireless repeater comprise a first TDD non-frequency translating wireless repeater and a second TDD non-frequency translating wireless repeater, respectively.

65. An article comprising a non-transitory storage medium comprising machine-readable instructions stored thereon which, if executed by a computing platform, are adapted to enable said computing platform to:
operate in a multiple-input-multiple-output (MIMO) wireless network at a first time division duplex (TDD) wireless repeater;
identify a presence of a second TDD wireless repeater that is spatially separated from said first TDD wireless network;
enter into a mode with said second TDD wireless repeater to receive wireless transmissions in a synchronous manner with said second TDD wireless repeater on a same first frequency; and simultaneously re-transmit a first portion of said wireless transmissions while receiving a second portion of said wireless transmissions in a manner that is synchronous with said second TDD wireless repeater on a same second frequency, after MIMO signals are detected on both the same first frequency and the same second frequency.

66. The article of claim 65, wherein the first TDD wireless repeater comprises a master repeater and the second TDD wireless repeater comprises a slave repeater.

67. The article of claim 65, wherein the first TDD wireless repeater and the second TDD wireless repeater comprise a first TDD frequency translating wireless repeater and a second TDD frequency translating wireless repeater, respectively.

68. The article of claim 65, wherein the first TDD wireless repeater and the second TDD wireless repeater comprise a first TDD non-frequency translating wireless repeater and a second TDD non-frequency translating wireless repeater, respectively.

69. An apparatus comprising:
means for operating in a multiple-input-multiple-output (MIMO) wireless network at a first time division duplex (TDD) wireless repeater;
means for identifying a presence of a second TDD wireless repeater that is spatially separated from said first TDD wireless network;
means for entering into a mode with said second TDD wireless repeater to receive wireless transmissions in a synchronous manner with said second TDD wireless repeater on a same first frequency; and
means for simultaneously re-transmitting a first portion of said wireless transmissions while receiving a second portion of said wireless transmissions in a manner that is synchronous with said second TDD wireless repeater on a same second frequency, after MIMO signals are detected on both the same first frequency and the same second frequency.

70. The apparatus of claim 69, wherein the first TDD wireless repeater comprises a master repeater and the second TDD wireless repeater comprises a slave repeater.

71. The apparatus of claim 69, wherein the first TDD wireless repeater and the second TDD wireless repeater comprise a first TDD frequency translating wireless repeater and a second TDD frequency translating wireless repeater, respectively.

72. The apparatus of claim 69, wherein the first TDD wireless repeater and the second TDD wireless repeater comprise a first TDD non-frequency translating wireless repeater and a second TDD non-frequency translating wireless repeater, respectively.

73. A device comprising:
two or more physical layer repeaters to:
operate in a multiple-input-multiple-output (MIMO) wireless network at a first time division duplex (TDD) wireless repeater;
identify a presence of a second TDD wireless repeater that is spatially separated from said first TDD wireless network;
enter into a mode with said second TDD wireless repeater to receive wireless transmissions in a synchronous manner with said second TDD wireless repeater on a same first frequency; and
simultaneously re-transmit a first portion of said wireless transmissions while receiving a second portion of said wireless transmissions in a manner that is synchronous with said second TDD wireless repeater on a same second frequency, after MIMO signals are detected on both the same first frequency and the same second frequency.

74. The device of claim 73, wherein the first TDD wireless repeater comprises a master repeater and the second TDD wireless repeater comprises a slave repeater.

75. The device of claim 73, wherein the first TDD wireless repeater and the second TDD wireless repeater comprise a first TDD frequency translating wireless repeater and a second TDD frequency translating wireless repeater, respectively.

76. The device of claim 73, wherein the first TDD wireless repeater and the second TDD wireless repeater comprise a first TDD non-frequency translating wireless repeater and a second TDD non-frequency translating wireless repeater, respectively.

77. An apparatus comprising:
means for receiving a wireless signal transmitted to or received from at least one Multiple Input Multiple Output (MIMO) wireless network station on a first frequency; and
means for simultaneously re-transmitting said wireless signal on a second frequency while continuing to receive said wireless signal on the first frequency, after MIMO signals are detected on both the first frequency and the second frequency.

78. The apparatus of claim 77, wherein said means for re-transmitting is performed synchronously with received MIMO packets.

79. The apparatus of claim 77, wherein said means for re-transmitting comprises time division duplexing (TDD).

80. The apparatus of claim 77, wherein said received wireless signal comprises at least one MIMO packet.

81. The apparatus of claim 80, wherein said wireless signal is transmitted according to an 802.11n protocol.

82. The apparatus of claim 77, wherein said received MIMO packet comprises a first plurality of information streams.

83. An article comprising a non-transitory storage medium comprising machine-readable instructions stored thereon which, if executed by a computing platform, are adapted to enable said computing platform to:
receive a wireless signal transmitted to or received from at least one Multiple Input Multiple Output (MIMO) wireless network station on a first frequency; and
simultaneously re-transmit said wireless signal on a second frequency while continuing to receive said wireless signal on the first frequency, after MIMO signals are detected on both the first frequency and the second frequency.

84. The article of claim 83, wherein said re-transmitting is performed synchronously with received MIMO packets.

85. The article of claim 83, wherein said re-transmitting comprises time division duplexing (TDD).

86. The article of claim 83, wherein said received wireless signal comprises at least one MIMO packet.

87. The article of claim 86, wherein said received MIMO packet comprises a first plurality of information streams.

88. The article of claim 86, wherein said wireless signal is transmitted according to an 802.11n protocol.

89. A method comprising:
receiving a wireless signal from at least one multiple-input-multiple-output (MIMO) wireless network station; and
simultaneously re-transmitting said wireless signal while continuing to receive said wireless signal, wherein two or more physical layer repeaters are adapted to receive said wireless signal from said at least one MIMO wireless network station on a first frequency and synchronously re-transmit said wireless signal while continuing to receive said wireless signal on a second frequency, after MIMO signals are detected on both the first frequency and the second frequency.

90. The method of claim 89, wherein said wireless signal is transmitted according to an 802.11n protocol.

91. The method of claim 89, wherein said received wireless signal comprises a MIMO packet.

92. The method of claim 91, wherein said received MIMO packet comprises a first plurality of information streams.

93. The method of claim 89, wherein said two or more physical layer repeaters comprise frequency division duplex (FDD) repeaters.

94. The method of claim 89, wherein said two or more physical layer repeaters are adapted to support two or more modes of a wireless protocol.

95. An apparatus comprising:
  means for receiving a wireless signal from at least one multiple-input-multiple-output (MIMO) wireless network station; and
  means for simultaneously re-transmitting said wireless signal while continuing to receive said wireless signal, wherein two or more physical layer repeaters are adapted to receive said wireless signal from said at least one MIMO wireless network station on a first frequency and synchronously re-transmit said wireless signal while continuing to receive said wireless signal on a second frequency, after MIMO signals are detected on both the first frequency and the second frequency.

96. The apparatus of claim 95, wherein said wireless signal is transmitted according to an 802.11n protocol.

97. The apparatus of claim 95, wherein said received wireless signal comprises a MIMO packet.

98. The apparatus of claim 97, wherein said received MIMO packet comprises a first plurality of information streams.

99. The apparatus of claim 95, wherein said two or more physical layer repeaters comprise frequency division duplex (FDD) repeaters.

100. The apparatus of claim 95, wherein said two or more physical layer repeaters are adapted to support two or more modes of a wireless protocol.

101. An article comprising a non-transitory storage medium comprising machine-readable instructions stored thereon which, if executed by a computing platform, are adapted to enable said computing platform to:
  receive a wireless signal from at least one multiple-input-multiple-output (MIMO) wireless network station; and
  simultaneously re-transmit said wireless signal while continuing to receive said wireless signal, wherein two or more physical layer repeaters are adapted to receive said wireless signal from said at least one MIMO wireless network station on a first frequency and synchronously re-transmit said wireless signal while continuing to receive said wireless signal on a second frequency, after MIMO signals are detected on both the first frequency and the second frequency.

102. The article of claim 101, wherein said wireless signal is transmitted according to an 802.11n protocol.

103. The article of claim 101, wherein said received wireless signal comprises a MIMO packet.

104. The article of claim 103, wherein said received MIMO packet comprises a first plurality of information streams.

105. The article of claim 101, wherein said two or more physical layer repeaters comprise frequency division duplex (FDD) repeaters.

106. The article of claim 101, wherein said two or more physical layer repeaters are adapted to support two or more modes of a wireless protocol.

* * * * *